US010907499B2

(12) United States Patent
Iwasaki et al.

(10) Patent No.: US 10,907,499 B2
(45) Date of Patent: Feb. 2, 2021

(54) ROTOR-BLADE-SIDE SEALING APPARATUS, STATIONARY-BLADE-SIDE SEALING APPARATUS, AND ROTARY MACHINE

(71) Applicant: MITSUBISHI HEAVY INDUSTRIES, LTD., Tokyo (JP)

(72) Inventors: Makoto Iwasaki, Tokyo (JP); Rimpei Kawashita, Tokyo (JP); Yasunori Tokimasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 82 days.

(21) Appl. No.: 16/282,611

(22) Filed: Feb. 22, 2019

(65) Prior Publication Data

US 2019/0277158 A1    Sep. 12, 2019

(30) Foreign Application Priority Data

Mar. 8, 2018  (JP) ................................. 2018-041740

(51) Int. Cl.
  *F01D 11/08*  (2006.01)
  *F01D 25/06*  (2006.01)
  *F01D 11/00*  (2006.01)

(52) U.S. Cl.
  CPC ............ *F01D 25/06* (2013.01); *F01D 11/001* (2013.01); *F01D 11/08* (2013.01);
  (Continued)

(58) Field of Classification Search
  CPC ........ F01D 11/001; F01D 11/02; F01D 11/08; F05D 2240/55
  See application file for complete search history.

(56) References Cited

U.S. PATENT DOCUMENTS 5,735,667 A * 4/1998 Sanders .................. F01D 11/02
                                         415/170.1
6,116,608 A * 9/2000 Wolfe ..................... F01D 11/08
                                         277/355

(Continued)

FOREIGN PATENT DOCUMENTS

JP        2011-247307       12/2011
JP        2014-55588         3/2014

*Primary Examiner* — Ninh H. Nguyen
(74) *Attorney, Agent, or Firm* — Wenderoth, Lind & Ponack, L.L.P.

(57) ABSTRACT

A rotor-blade-side sealing apparatus is configured to seal leakage of working fluid between rotor blade rings connected to distal end portions of rotor blade main bodies attached so as to extend in a radial direction from a rotor main body configured to rotate about an axis in a casing, and an inner circumferential surface of the casing. The rotor-blade-side sealing apparatus includes a sealing fin protruding in the radial direction from a side of the inner circumferential surface of the casing toward one of the rotor blade rings and extending in a circumferential direction. The sealing fin includes: a first sealing-fin main body portion and a second sealing-fin main body portion separated from each other in the circumferential direction across a gap portion that is a discontinuity along the circumferential direction; and an extending portion extending toward an upstream side in an axial direction of the rotor main body.

7 Claims, 15 Drawing Sheets

(52) U.S. Cl.
CPC ...... *F05D 2220/32* (2013.01); *F05D 2240/55* (2013.01); *F05D 2260/96* (2013.01)

(56) References Cited

U.S. PATENT DOCUMENTS

| | | | |
|---|---|---|---|
| 8,388,311 B2 * | 3/2013 | Yamaguchi | F04D 29/102 |
| | | | 415/174.5 |
| 9,200,528 B2 | 12/2015 | Zheng et al. | |
| 2017/0298754 A1 * | 10/2017 | Sanders | F01D 11/02 |

* cited by examiner

UPSTREAM SIDE ←→ DOWNSTREAM SIDE
IN DIRECTION OF AXIS O    IN DIRECTION OF AXIS O

UPSTREAM SIDE ←→ DOWNSTREAM SIDE
IN DIRECTION OF AXIS O    IN DIRECTION OF AXIS O

UPSTREAM SIDE　←—→　DOWNSTREAM SIDE
IN DIRECTION OF AXIS O　　IN DIRECTION OF AXIS O

UPSTREAM SIDE
IN DIRECTION OF AXIS O ⟵⟶ DOWNSTREAM SIDE
IN DIRECTION OF AXIS O

UPSTREAM SIDE IN DIRECTION OF AXIS O ↔ DOWNSTREAM SIDE IN DIRECTION OF AXIS O

ROTOR-BLADE-SIDE SEALING APPARATUS, STATIONARY-BLADE-SIDE SEALING APPARATUS, AND ROTARY MACHINE

TECHNICAL FIELD

This disclosure relates to a rotor-blade-side sealing apparatus, a stationary-blade-side sealing apparatus, and a rotary machine.

BACKGROUND

Hitherto, rotary machines such as steam turbines and gas turbines used in power plants and the like are known. The rotary machine includes rotor blades supported by a turbine rotor (hereinafter simply referred to as a "rotor") that is rotatable with respect to a casing, and stationary blades supported by the casing, and the energy of the working fluid flowing from the upstream side to the downstream side in the axial direction of the rotor is converted to the rotational energy of the rotor.

In the abovementioned rotary machine, the following feature is known. A swirling flow (so-called swirl flow) is generated in the circumferential direction of the rotor when the working fluid swerving from the main flow path flows into a sealing portion while the working fluid is still containing the swirling flow component applied to the working fluid when the working fluid passes through a nozzle. The sealing portion seals a place between the rotor or the rotor blades and the casing. By the swirl flow, a sinusoidal pressure distribution having a peak in a direction different from the eccentric direction of the rotor is generated in the circumferential direction of the rotor when eccentricity is generated in the rotor. This may cause self-excited vibration of the rotor when the swirl flow increases in accordance with high-power operation, for example. Therefore, various structures for suppressing the swirl flow in the sealing portion are devised. For example, JP 2014-55588 A discloses a configuration in which a plurality of holes are formed in sealing teeth of a sealing assembly so as to pass through the sealing teeth in the axial direction of a rotating part.

SUMMARY

In recent years, in rotary machines such as steam turbines and gas turbines, there is a tendency to reduce the rotor diameter and increase stages of the blades in order to enhance the turbine efficiency. Therefore, the diameter of the rotor decreases and the axis of the rotor increases, and hence the self-excited vibration of the rotor tends to be generated more easily. Thus, measures for suppressing the self-excited vibration more effectively is required.

In view of the abovementioned situation, an object of at least an embodiment of the present invention is to suppress the generation of self-excited vibration in a rotary machine.

(1) A rotor-blade-side sealing apparatus according to at least an embodiment of the present invention is a rotor-blade-side sealing apparatus that seals leakage of working fluid between rotor blade rings connected to distal end portions of a plurality of rotor blade main bodies attached so as to extend in a radial direction from a rotor main body that rotates about an axis in a casing, and an inner circumferential surface of the casing, and includes a sealing fin protruding in the radial direction from a side of the inner circumferential surface of the casing toward the rotor blade rings and extending in a circumferential direction of the rotor main body. In the rotor-blade-side sealing apparatus, the sealing fin includes: a first sealing-fin main body portion and a second sealing-fin main body portion separated from each other in the circumferential direction across a gap portion that is a discontinuity along the circumferential direction; and a first extending portion extending toward an upstream side in an axial direction of the axis as the first extending portion approaches from an end portion of the first sealing-fin main body portion to a downstream side in a rotation direction of the rotor main body.

For the purpose of illustration, the swirl flow flowing toward the downstream side in the rotation direction of the rotor main body along the sealing fin between the rotor blade rings and the inner circumferential surface of the casing on the upstream side of the sealing fin in the axial direction of the rotor main body the side may be simply referred to as an upstream swirl flow. The swirl flow flowing toward the downstream side in the rotation direction of the rotor main body along the sealing fin between the rotor blade rings and the inner circumferential surface of the casing on the downstream side of the sealing fin in the axial direction of the rotor main body may be simply referred to as a downstream swirl flow.

In the description below, the flow rate of the swirl flow flowing toward the downstream side in the rotation direction of the rotor main body may be referred to as a circumferential velocity of the swirl flow or simply as a circumferential velocity.

According to the configuration of (1) above, the first extending portion extends so as to approach the upstream side in the axial direction of the rotor main body as the first extending portion approaches the downstream side in the rotation direction of the rotor main body. Therefore, the velocity component toward the upstream side in the axial direction of the rotor main body is applied to the upstream swirl flow by the first extending portion. Thus, a spiral flow can be generated in the upstream swirl flow, and the circumferential velocity of the upstream swirl flow can be suppressed. According to the configuration of (1) above, a part of the upstream swirl flow flows into the downstream side of the sealing fin in the axial direction of the rotor main body via the gap portion. Thus, the working fluid flowing into the downstream side of the sealing fin in the axial direction of the rotor main body via the gap portion can affect the flow of the downstream swirl flow, and the circumferential velocity of the downstream swirl flow can be suppressed. As a result, in the rotary machine using the rotor-blade-side sealing apparatus according to the configuration of (1) above, the generation of the self-excited vibration can be suppressed.

(2) In several embodiments, in the configuration of (1) above, the sealing fin further includes a second extending portion extending toward a downstream side in the axial direction as the second extending portion approaches from an end portion of the second sealing-fin main body portion to an upstream side in the rotation direction of the rotor main body.

According to the configuration of (2) above, the sealing fin includes the second extending portion extending from the end portion of the second sealing-fin main body portion, and hence the working fluid flowing into the downstream side of the sealing fin in the axial direction of the rotor main body via the gap portion is guided by the second extending portion. At that time, the second extending portion extends so as to approach the downstream side in the axial direction of the rotor main body as the second extending portion approaches the upstream side in the rotation direction of the rotor main body. Therefore, a velocity component toward the upstream side in the rotation direction of the rotor main body is applied to the working fluid guided by the second extending portion. Thus, the circumferential velocity of the downstream swirl flow is suppressed by the working fluid guided by the second extending portion. As a result, in the rotary machine using the rotor-blade-side sealing apparatus according to the configuration of (2) above, the generation of the self-excited vibration can be effectively suppressed.

(3) In several embodiments, in the configuration of (2) above, at least a part of a surface of the first extending portion on the downstream side in the axial direction of the rotor main body and at least a part of a surface of the second extending portion on the upstream side in the axial direction of the rotor main body are opposed to each other across the gap portion.

The configuration of (3) above includes the configuration in the configuration of (2) above, and hence a velocity component toward the upstream side in the rotation direction of the rotor main body is applied to the working fluid flowing into the downstream side of the sealing fin in the axial direction of the rotor main body via the gap portion. According to the configuration of (3) above, the working fluid flowing into the downstream side of the sealing fin in the axial direction of the rotor main body via the gap portion passes through a part (hereinafter referred to as an opposed section) in which at least a part of the surface of the first extending portion on the downstream side in the axial direction of the rotor main body and at least a part of the surface of the second extending portion on the upstream side in the axial direction of the rotor main body are opposed to each other across the gap portion. Thus, as compared to when the opposed section is not included, the passing velocity of the working fluid that has passed through the opposed section increases. That is, according to the configuration of (3) above, a larger velocity component toward the upstream side in the rotation direction of the rotor main body is applied to the working fluid flowing into the downstream side of the sealing fin in the axial direction of the rotor main body via the gap portion when the working fluid passes through the opposed section. As a result, in the rotary machine using the rotor-blade-side sealing apparatus according to the configuration of (3) above, the generation of the self-excited vibration can be more effectively suppressed.

(4) In several embodiments, in the configuration of (3) above, at least a part of the surface of the first extending portion on the downstream side in the axial direction of the rotor main body and at least a part of the surface of the second extending portion on the upstream side in the axial direction of the rotor main body are opposed to each other across the gap portion by a certain separated distance.

According to the configuration of (4) above, at least a part of the surface of the first extending portion on the downstream side in the axial direction of the rotor main body and at least a part of the surface of the second extending portion on the upstream side in the axial direction of the rotor main body are opposed to each other across the gap portion by a certain separated distance. Therefore, the flow of the working fluid passing through the opposed section in which the first extending portion and the second extending portion are opposed to each other flows into the downstream side against the downstream swirl flow. As a result, the flow passing through the opposed section and the downstream swirl flow are mixed together while causing turbulence. As a result, the effect of suppressing the circumferential velocity of the downstream swirl flow by the working fluid passing through the opposed section and flowing into the downstream side of the sealing fin in the axial direction of the rotor main body can be increased.

(5) In several embodiments, in the configuration of (3) above, at least a part of the surface of the first extending portion on the downstream side in the axial direction of the rotor main body and at least a part of the surface of the second extending portion on the upstream side in the axial direction of the rotor main body are opposed to each other across the gap portion, and have a separated distance which decreases as approaching the downstream side in the axial direction of the rotor main body.

According to the configuration of (5) above, at least a part of the surface of the first extending portion on the downstream side in the axial direction of the rotor main body and at least a part of the surface of the second extending portion on the upstream side in the axial direction of the rotor main body are opposed to each other across the gap portion, and have the separated distance which decreases as approaching the downstream side in the axial direction of the rotor main body. Therefore, in the opposed section in which the first extending portion and the second extending portion are opposed to each other, the flow rate of the working fluid increases as the opposed section approaches the downstream side in the axial direction of the rotor main body. Therefore, the flow rate of the working fluid flowing into the downstream side of the sealing fin in the axial direction of the rotor main body can be increased. Thus, a velocity component toward the upstream side in the rotation direction of the rotor main body in the working fluid flowing into the downstream side of the sealing fin in the axial direction of the rotor main body can be increased. As a result, the effect of suppressing the circumferential velocity of the downstream swirl flow by the working fluid passing through the gap portion and flowing into the downstream side of the sealing fin in the axial direction of the rotor main body can be increased.

(6) In several embodiments, in the configuration of any one of (1) to (5) above, the first extending portion linearly extends so as to approach the upstream side in the axial direction of the rotor main body as the first extending portion approaches the downstream side in the rotation direction of the rotor main body.

According to the configuration of (6) above, the first extending portion linearly extends. Therefore, the shape of the first extending portion becomes simple, and the first extending portion is easily formed.

(7) In several embodiments, in the configuration of (6) above, the first extending portion extends so as to approach the upstream side in the axial direction of the rotor main body at an inclination angle of 30 degrees or more and 60 degrees or less with respect to an extending direction of the first sealing-fin main body portion as the first extending portion approaches the downstream side in the rotation direction of the rotor main body.

The inclination angle of the first extending portion with respect to the extending direction of the first sealing-fin main body portion, that is, the deviation angle between the extending direction of the first extending portion and the extending direction of the first sealing-fin main body portion is desired to be set within a predetermined range from the following viewpoints. In the description below, the inclination angle of the first extending portion with respect to the extending direction of the first sealing-fin main body portion is simply referred to as the inclination angle of the first extending portion.

That is, when the inclination angle of the first extending portion is smaller than 30 degrees, the effect of applying the velocity component toward the upstream side in the axial direction of the rotor main body to the upstream swirl flow is small, and hence there is a fear that it becomes difficult to generate a spiral flow in the upstream swirl flow. Thus, there is a fear that the effect of suppressing the circumferential velocity of the upstream swirl flow becomes difficult to obtain. Therefore, the inclination angle of the first extending portion is desired to be 30 degrees or more.

When the inclination angle of the first extending portion is larger than 60 degrees, the velocity component toward the upstream side in the rotation direction of the rotor main body in the working fluid flowing into the downstream side of the sealing fin in the axial direction of the rotor main body via the gap portion becomes small. Thus, the effect of suppressing the circumferential velocity of the downstream swirl flow becomes small. Therefore, the inclination angle of the first extending portion is desired to be 60 degrees or less.

In that respect, according to the configuration of (7) above, the inclination angle of the first extending portion is set to 30 degrees or more and 60 degrees or less, and hence the circumferential velocity of the upstream swirl flow and the downstream swirl flow can be effectively suppressed.

(8) In several embodiments, in the configuration of any one of (1) to (5) above, the first extending portion extends so as to form a convex toward the gap portion such that the first extending portion approaches the upstream side in the axial direction of the rotor main body as the first extending portion approaches the downstream side in the rotation direction of the rotor main body.

According to the configuration of (8) above, the first extending portion extends so as to form a convex toward the gap portion, and hence the velocity component toward the upstream side in the axial direction of the rotor main body can be effectively applied to the upstream swirl flow.

(9) In several embodiments, in the configuration of any one of (1) to (5) above, the first sealing-fin main body portion and the second sealing-fin main body portion are formed in a same position in the axial direction of the rotor main body.

According to the configuration of (9) above, by forming the first sealing-fin main body portion and the second sealing-fin main body portion in the same position in the axial direction of the rotor main body, the sealing fin is formed easier as compared to when the first sealing-fin main body portion and the second sealing-fin main body portion are formed in different positions in the axial direction of the rotor main body.

(10) In several embodiments, in the configuration of any one of (3) to (5) above, the second sealing-fin main body portion is formed upstream of the first sealing-fin main body portion in the axial direction of the rotor main body.

According to the configuration of (10) above, the configuration of (3) above is included, and hence the working fluid flowing into the downstream side of the sealing fin in the axial direction of the rotor main body via the gap portion passes through the opposed section in which the first extending portion and the second extending portion are opposed to each other. According to the configuration of (10) above, the second sealing-fin main body portion is formed upstream of the first sealing-fin main body portion in the axial direction of the rotor main body. Therefore, the length of the above-mentioned opposed section can be increased as compared to when the second sealing-fin main body portion is not formed upstream of the first sealing-fin main body portion in the axial direction of the rotor main body. Thus, the working fluid flowing into the downstream side of the sealing fin in the axial direction of the rotor main body via the gap portion passes through a longer opposed section as compared to when the second sealing-fin main body portion is not formed upstream of the first sealing-fin main body portion in the axial direction of the rotor main body, and hence a larger velocity component toward the upstream side in the rotation direction of the rotor main body is applied to the working fluid. As a result, in the rotary machine using the rotor-blade-side sealing apparatus according to the configuration of (10) above, the generation of the self-excited vibration can be more effectively suppressed.

(11) In several embodiments, in the configuration of any of (1) to (10) above, the sealing fin includes an upstream sealing fin formed on the upstream side in the axial direction of the rotor main body, and a downstream sealing fin formed downstream of the upstream sealing fin in the axial direction of the rotor main body, and the upstream sealing fin and the downstream sealing fin each include the first sealing-fin main body portion, the second sealing-fin main body portion, and the first extending portion.

According to the configuration of (11) above, the first extending portion of the upstream sealing fin extends so as to approach the upstream side in the axial direction of the rotor main body as the first extending portion approaches the downstream side in the rotation direction of the rotor main body. Therefore, a velocity component toward the upstream side in the axial direction of the rotor main body is applied to the swirl flow flowing toward the downstream side in the rotation direction of the rotor main body along the first sealing-fin main body portion of the upstream sealing fin between the rotor blade rings and the inner circumferential surface of the casing, that is, the upstream swirl flow according to the upstream sealing fin by the first extending portion of the upstream sealing fin. Thus, a spiral flow can be generated in the swirl flow, and the circumferential velocity of the swirl flow can be suppressed. According to the configuration of (11) above, a part of the upstream swirl flow according to the upstream sealing fin flows into a place between the upstream sealing fin and the downstream sealing fin via the gap portion of the upstream sealing fin. Thus, the working fluid flowing into a place between the upstream sealing fin and the downstream sealing fin via the gap portion of the upstream sealing fin can affect the swirl flow flowing through a place between the upstream sealing fin and the downstream sealing fin, that is, the flow of the downstream swirl flow according to the upstream sealing fin, and the circumferential velocity of the swirl flow can be suppressed.

The swirl flow flowing through a place between the upstream sealing fin and the downstream sealing fin is the downstream swirl flow according to the upstream sealing fin with respect to the upstream sealing fin, but is the upstream swirl flow according to the downstream sealing fin with respect to the downstream sealing fin.

Similarly, according to the configuration of (11) above, the first extending portion of the downstream sealing fin extends so as to approach the upstream side in the axial direction of the rotor main body as the first extending portion approaches the downstream side in the rotation direction of the rotor main body. Therefore, a velocity component toward the upstream side in the axial direction of the rotor main body is applied to the swirl flow flowing through a place between the upstream sealing fin and the downstream sealing fin, that is, the upstream swirl flow according to the downstream sealing fin by the first extending portion of the downstream sealing fin. Thus, a spiral flow can be generated in the swirl flow, and the circumferential velocity of the swirl flow can be suppressed. According to the configuration of (11) above, a part of the upstream swirl flow according to the downstream sealing fin flows into the downstream side of the downstream sealing fin in the axial direction of the rotor main body via the gap portion of the downstream sealing fin. Thus, the working fluid flowing into the downstream side of the downstream sealing fin in the axial direction of the rotor main body via the gap portion of the downstream sealing fin can affect the swirl flow on the downstream side of the downstream sealing fin in the axial direction of the rotor main body, that is, the flow of the downstream swirl flow according to the downstream sealing fin, and the circumferential velocity of the swirl flow can be suppressed.

As a result, in the rotary machine using the rotor-blade-side sealing apparatus according to the configuration of (11) above, the generation of the self-excited vibration can be effectively suppressed.

(12) In several embodiments, in the configuration of (11) above, a downstream gap portion that is a discontinuity along the circumferential direction in the downstream sealing fin is provided upstream, in the rotation direction of the rotor main body, of an upstream gap portion that is a discontinuity along the circumferential direction in the upstream sealing fin.

According to the configuration of (12) above, the downstream gap portion is provided upstream of the upstream gap portion in the rotation direction of the rotor main body. Therefore, as described below, the circumferential velocity of the swirl flow flowing through a place between the upstream sealing fin and the downstream sealing fin can be effectively suppressed as compared to when the downstream gap portion is not provided upstream of the upstream gap portion in the rotation direction of the rotor main body.

That is, according to the configuration of (12) above, it becomes easier for the working fluid that has passed through the upstream gap portion to further flow into the downstream side of the downstream sealing fin in the axial direction of the rotor main body from the downstream gap portion after flowing into a place between the upstream sealing fin and the downstream sealing fin as compared to when the downstream gap portion is not provided upstream of the upstream gap portion in the rotation direction of the rotor main body. Therefore, according to the configuration of (12) above, the passing velocity of the working fluid that has passed through the upstream gap portion can be increased as compared to when the downstream gap portion is not provided upstream of the upstream gap portion in the rotation direction of the rotor main body.

In the configuration of (12) above, the configuration of (11) above is included, and hence a velocity component toward the upstream side in the rotation direction of the rotor main body is applied to the working fluid passing through the upstream gap portion and flowing into a place between the upstream sealing fin and the downstream sealing fin when the working fluid passes through the upstream gap portion. Therefore, when the passing velocity of the working fluid passing through the upstream gap portion increases, the velocity component toward the upstream side in the rotation direction of the rotor main body in the working fluid also increases. As a result, the effect of suppressing the circumferential velocity of the swirl flow flowing through a place between the upstream sealing fin and the downstream sealing fin by the working fluid can be increased.

(13) In several embodiments, in the configuration of any of (1) to (12) above, the sealing fin further includes a second extending portion extending from an end portion of the second sealing-fin main body portion toward an upstream side in the rotation direction of the rotor main body and extending so as to approach a downstream side in the axial direction of the rotor main body as the second extending portion approaches the upstream side in the rotation direction, the sealing fin at least includes a first segment and a second segment obtained by dividing the sealing fin in the circumferential direction of the rotor main body, the first sealing-fin main body portion and the first extending portion are provided in the first segment, and the second sealing-fin main body portion and the second extending portion are provided in the second segment.

According to the configuration of (13) above, the first sealing-fin main body portion and the first extending portion are provided in the first segment, and the second sealing-fin main body portion and the second extending portion are provided in the second segment, and hence the first extending portion and the second extending portion are easily formed.

(14) A stationary-blade-side sealing apparatus according to at least an embodiment of the present invention is a stationary-blade-side sealing apparatus that seals leakage of working fluid between stationary blade rings connected to distal end portions of a plurality of stationary blade main bodies attached so as to extend inward in a radial direction toward a rotor main body that rotates about an axis in a casing, and an outer peripheral surface of the rotor main body, and includes a sealing fin protruding in the radial direction from a side of the stationary blade rings toward the outer peripheral surface of the rotor main body and extending in a circumferential direction of the rotor main body. In the stationary-blade-side sealing apparatus, the sealing fin includes: a first sealing-fin main body portion and a second sealing-fin main body portion separated from each other in the circumferential direction across a gap portion that is so as to be a discontinuity along the circumferential direction; and a first extending portion extending from an end portion of the first sealing-fin main body portion toward a downstream side in a rotation direction of the rotor main body and extending so as to approach an upstream side in an axial direction of the rotor main body as the first extending portion approaches the downstream side in the rotation direction.

According to the configuration of (14) above, the first extending portion extends so as to approach the upstream side in the axial direction of the rotor main body as the first extending portion approaches the downstream side in the rotation direction of the rotor main body. Therefore, a velocity component toward the upstream side in the axial direction of the rotor main body is applied to the swirl flow flowing toward the downstream side in the rotation direction of the rotor main body along the sealing fin between the stationary blade rings and the outer peripheral surface of the rotor main body by the first extending portion. Thus, a spiral flow can be generated in the swirl flow, and the circumferential velocity of the swirl flow can be suppressed. According to the configuration of (14) above, a part of the swirl flow flowing toward the downstream side in the rotation direction of the rotor main body along the sealing fin flows into the downstream side of the sealing fin in the axial direction of the rotor main body via the gap portion. Thus, the working fluid flowing into the downstream side of the sealing fin in the axial direction of the rotor main body via the gap portion can affect the flow of the swirl flow on the downstream side of the sealing fin in the axial direction of the rotor main body, and the circumferential velocity of the swirl flow can be suppressed. As a result, in the rotary machine using the stationary-blade-side sealing apparatus according to the configuration of (14) above, the generation of the self-excited vibration can be suppressed.

(15) A rotary machine according to at least an embodiment of the present invention includes: the casing; the rotor main body; the plurality of rotor blade main bodies; the rotor blade rings; and the rotor-blade-side sealing apparatus according to any one of the configurations of (1) to (13) above.

According to the configuration of (15) above, the rotor-blade-side sealing apparatus according to the configuration of (1) above is included, and hence the generation of the self-excited vibration in the rotary machine can be suppressed.

According to at least an embodiment of the present invention, the generation of the self-excited vibration in the rotary machine can be suppressed.

DETAILED DESCRIPTION

Figure 1:
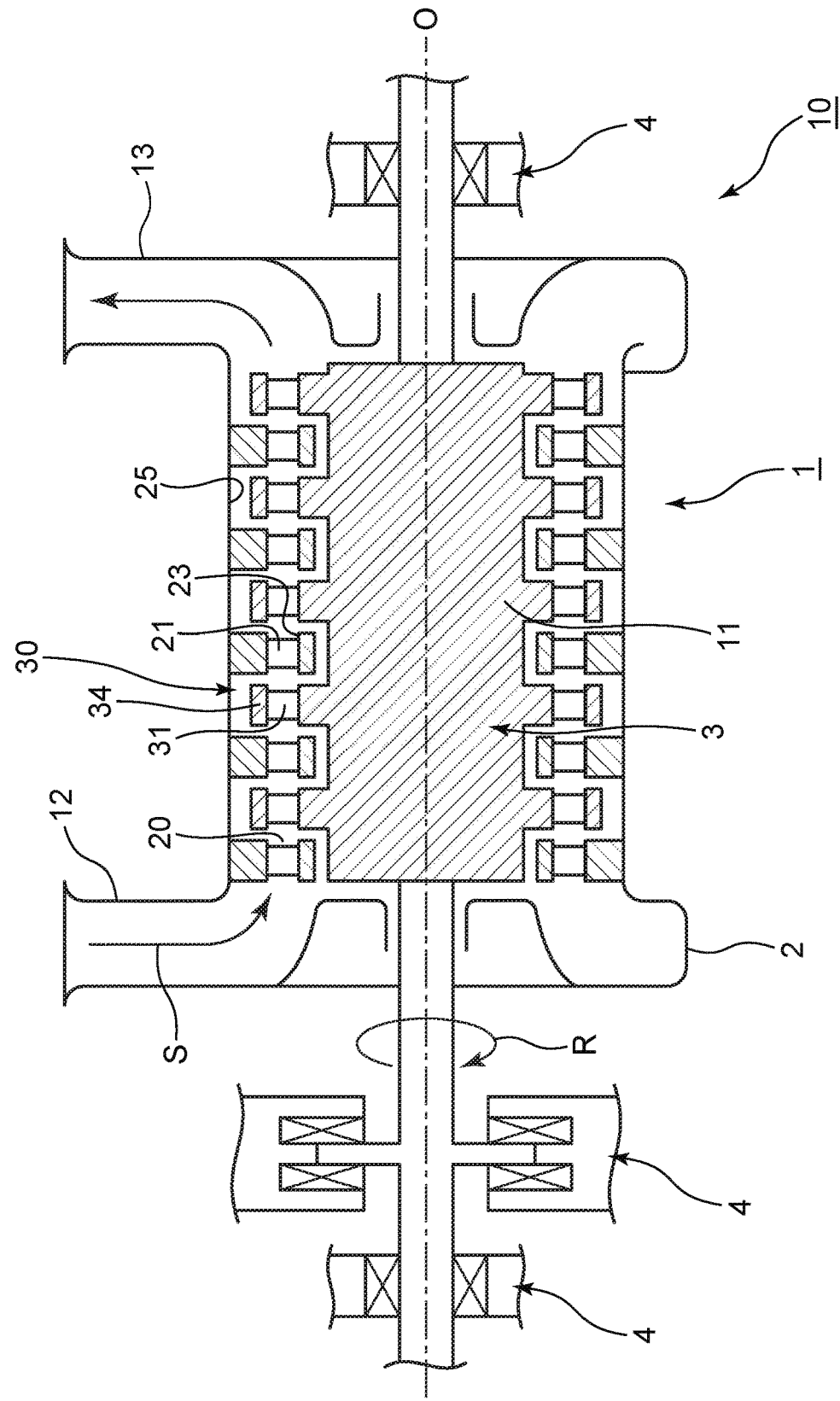
FIG. 1 is a view for describing a steam turbine as an example of a rotary machine including a rotor-blade-side sealing apparatus according to several embodiments.

Several embodiments of the present invention are described below with reference to the accompanying drawings. It is intended, however, that dimensions, materials, shapes, relative positions and the like of components described in the embodiments or illustrated in the drawings shall be interpreted as illustrative only and not limitative of the scope of the present invention.

For example, expressions expressing the relative or absolute arrangements such as "in a certain direction", "along a certain direction", "parallel", "orthogonal", "center", "concentric", or "coaxial" not only precisely express those arrangements, but also express states that are relatively displaced by a tolerance or by an angle or a distance by which the same function can be obtained.

For example, expressions expressing that objects are in an equal state such as "the same", "equal", and "uniform" not only express a precisely equal state, but also express a state in which a tolerance or a difference by which the same function can be obtained exists.

For example, expressions expressing shapes such as a quadrilateral shape and a cylindrical shape not only express shapes such as a quadrilateral shape and a cylindrical shape in a geometrically precise meaning, but also express shapes having uneven portions, chamfered portions, and the like within a range in which the same effect can be obtained.

Meanwhile, expressions of "comprising", "including", or "having" a component are not exclusive expressions that exclude the existence of other components.

Configuration of Steam Turbine 1

FIG. 1 is a view for describing a steam turbine as an example of a rotary machine including a rotor-blade-side sealing apparatus according to several embodiments.

As illustrated in FIG. 1, a steam turbine plant 10 includes a steam turbine 1 that is an axial-flow rotary machine, a steam supply pipe 12 that supplies steam S serving as working fluid to the steam turbine 1 from a steam supply source (not shown), and a steam discharge pipe 13 that is connected to the downstream side of the steam turbine 1 and discharges steam.

As illustrated in FIG. 1, the steam turbine 1 according to several embodiments includes a casing 2, a rotor main body 11 that rotates about an axis O in the casing 2, a rotor 3 connected to the rotor main body 11, and a bearing portion 4 that supports the rotor main body 11 so as to be rotatable about the axis O.

The rotor 3 includes the rotor main body 11 and turbine rotor blades 30. The turbine rotor blades 30 include a plurality of rotor blade main bodies 31 attached so as to extend in a radial direction from the rotor main body 11, and rotor blade rings 34 connected to distal end portions of the plurality of rotor blade main bodies 31.

The casing 2 is an approximately cylindrical member provided so as to cover the rotor 3 from the outer peripheral side. In the casing 2, a plurality of stationary blade main bodies 21 attached so as to extend inward in the radial direction toward the rotor main body 11 are provided. The plurality of stationary blade main bodies 21 are arranged along the circumferential direction of an inner circumferential surface 25 and the direction of the axis O. Stationary blade rings 23 connected to distal end portions of the plurality of rotor blade main bodies 31 are attached to the plurality of rotor blade main bodies 31.

In the casing 2, the region in which the stationary blade main bodies 21 and the rotor blade main bodies 31 are arranged forms a main flow path 20 through which the steam S serving as the working fluid flows.

Figure 2:
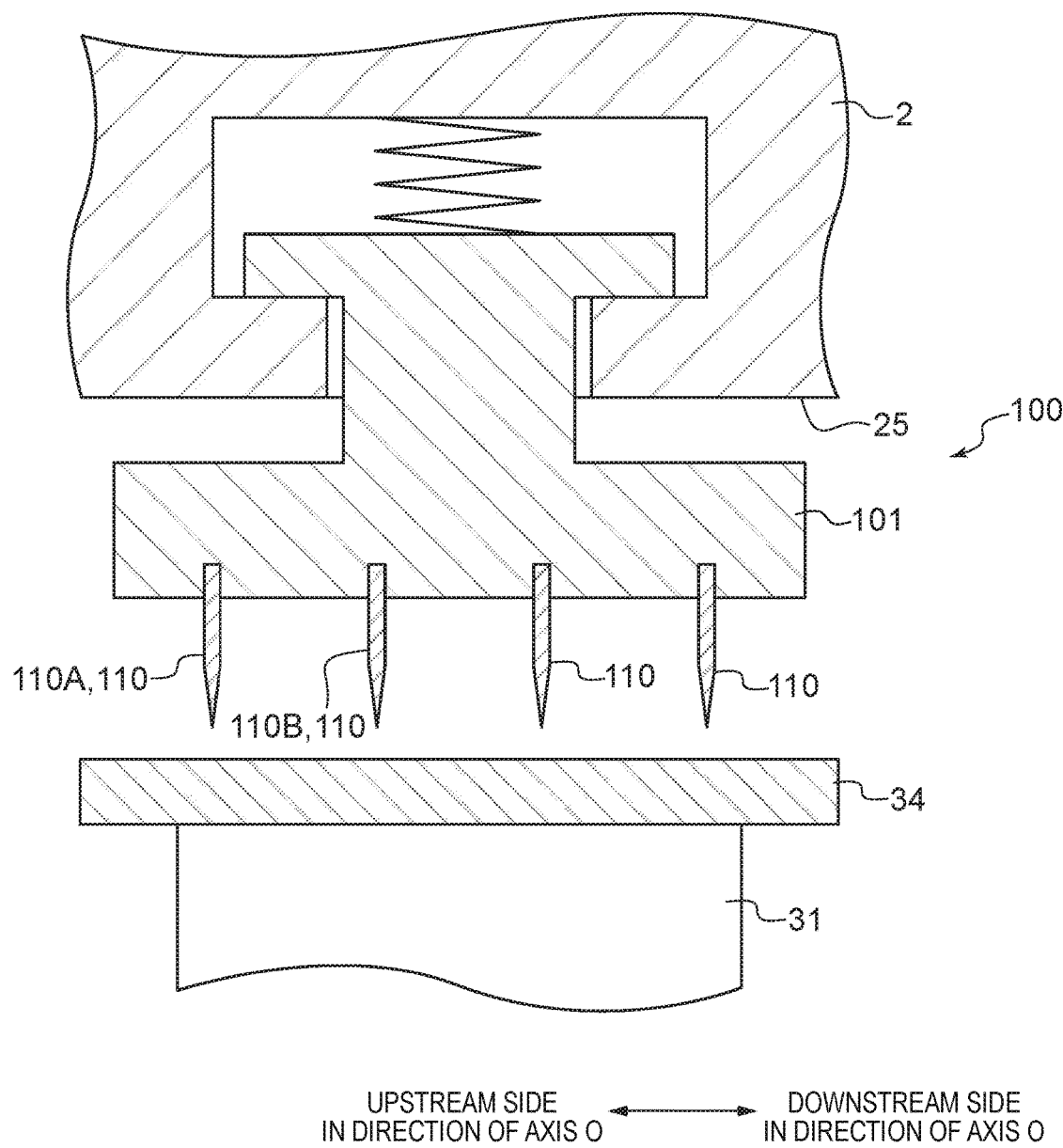
FIG. 2 is a view schematically illustrating the rotor-blade-side sealing apparatus according to several embodiments and is a cross-sectional view seen from the rotation direction of a rotor main body.

FIG. 2 is a view schematically illustrating a rotor-blade-side sealing apparatus 100 according to several embodiments, and is a cross-sectional view seen from the rotation direction of the rotor main body 11. The rotor-blade-side sealing apparatus 100 according to several embodiments is a sealing apparatus that seals leakage of the steam S between the rotor blade rings 34 and the inner circumferential surface 25 of the casing 2. The rotor-blade-side sealing apparatus 100 according to several embodiments includes a plurality of sealing segments 101 having an arc shape and biased inward in the radial direction against the casing 2.

Figure 3:
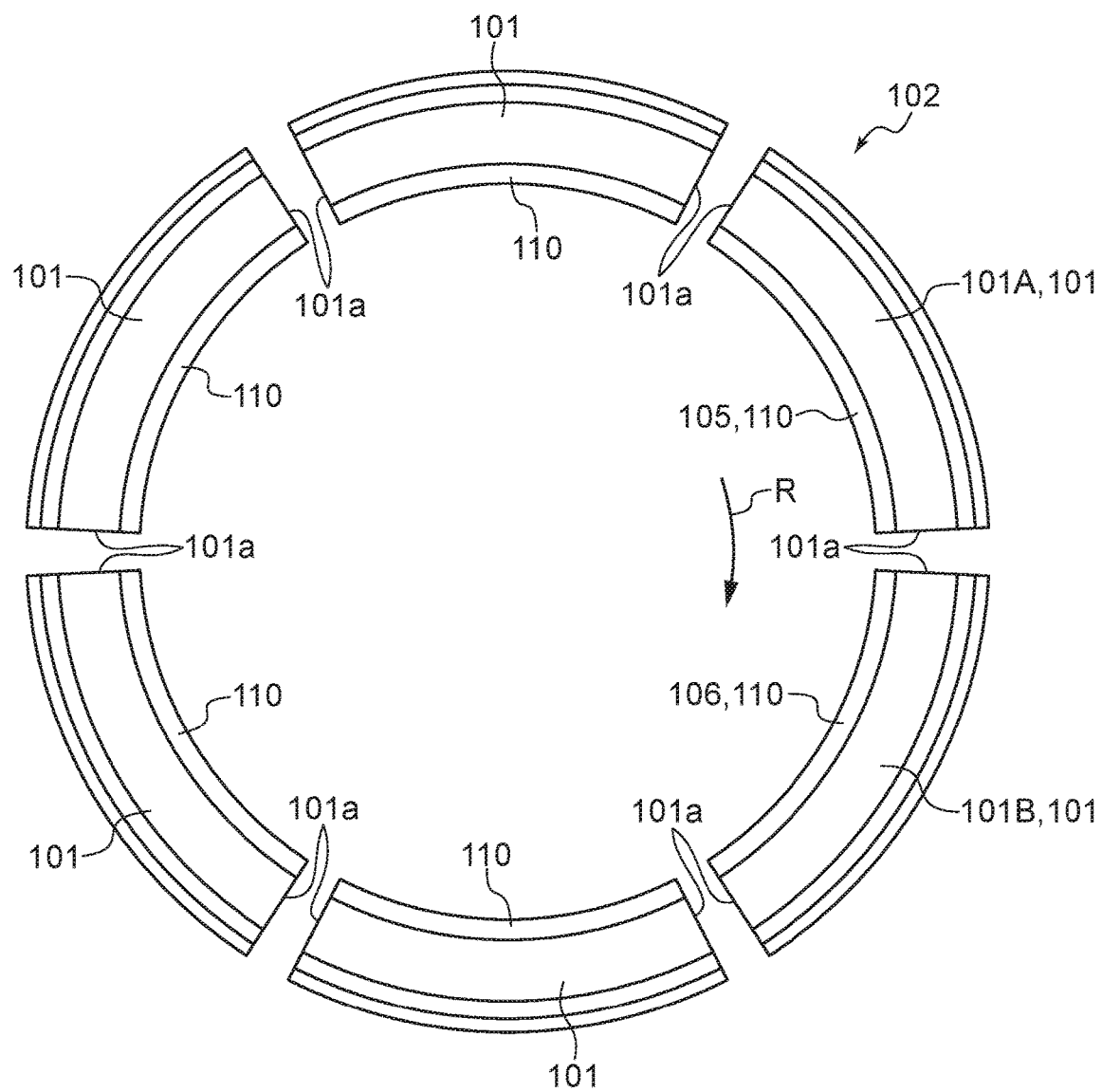
FIG. 3 is a view schematically illustrating a state of a plurality of sealing segments seen from the axial direction.

FIG. 3 is a view schematically illustrating a state of the plurality of sealing segments 101 seen from the direction of the axis O. In several embodiments, for example, six sealing segments 101 are arranged in the circumferential direction, and a ring-shaped seal packing 102 is formed by those six sealing segments 101. In other words, in several embodiments, the seal packing 102 is divided into six sealing segments 101 in the circumferential direction.

The sealing segments 101 adjacent to each other in the circumferential direction are each in contact with the counterpart sealing segment 101 at an end surface 101a in the circumferential direction.

In the description below, for the purpose of illustration, the rotation direction of the rotor main body 11 is indicated by arrow R. For the purpose of illustration, out of the two sealing segments 101 adjacent to each other in the circumferential direction, the sealing segment 101 on the upstream side in the rotation direction R of the rotor main body 11 may be referred to as a first sealing segment 101A, and the sealing segment 101 on the downstream side in the rotation direction R of the rotor main body 11 may be referred to as a second sealing segment 101B. The first sealing segment 101A and the second sealing segment 101B are relative nominal designations.

That is, when the rotor main body 11 (not shown in FIG. 3) rotates in the clockwise direction, for example, in the sealing segment 101 on the top right and the sealing segment 101 on the bottom right in FIG. 3 that are adjacent to each other, the sealing segment 101 on the top right is the first sealing segment 101A and the sealing segment 101 on the bottom right is the second sealing segment 101B. However, in the sealing segment 101 on the bottom right and the sealing segment 101 on the bottom adjacent to each other in FIG. 3, the sealing segment 101 on the bottom right is the first sealing segment 101A and the sealing segment 101 on the bottom is the second sealing segment 101B. As described above, the sealing segment 101 on the bottom right in FIG. 3 is the second sealing segment 101B in the relationship with the adjacent sealing segment 101 on the top right, and is the first sealing segment 101A in the relationship with the adjacent sealing segment 101 on the bottom.

As illustrated in FIG. 2, sealing fins 110 protruding in the radial direction from the inner circumferential surface 25 side of the casing 2 toward the rotor blade rings 34 and extending in the circumferential direction of the rotor main body 11 are formed on the inner circumferential surfaces of the sealing segments 101. In several embodiments, at least one or more sealing fins 110 are formed for the sealing segment 101. In the embodiment exemplified in FIG. 2, four sealing fins 110 are formed for the sealing segment 101 along the direction of the axis O so as to be separated from each other.

In the description below, for the purpose of illustration, out of the two sealing fins 110 adjacent to each other in the axial direction of the rotor main body, the sealing fin 110 formed on the upstream side in the direction of the axis O of the rotor main body 11 may be referred to as an upstream sealing fin 110A, and the sealing fin 110 formed on the downstream side in the direction of the axis O of the rotor main body 11 may be referred to as a downstream sealing fin 110B. The upstream sealing fin 110A and the downstream sealing fin 110B are relative nominal designations.

That is, as illustrated in FIG. 2, when the left side in FIG. 2 is the upstream side in the direction of the axis O of the rotor main body 11 and the right side in FIG. 2 is the downstream side in the direction of the axis O of the rotor main body 11, out of the leftmost sealing fin 110 and the second sealing fin 110 from the left adjacent to each other in FIG. 2, the leftmost sealing fin 110 is the upstream sealing fin 110A and the second sealing fin 110 from the left is the downstream sealing fin 110B, for example. However, out of the second sealing fin 110 from the left and the third sealing fin 110 from the left adjacent to each other in FIG. 2, the second sealing fin 110 from the left is the upstream sealing fin 110A and the third sealing fin 110 from the left is the downstream sealing fin 110B. As described above, the second sealing fin 110 from the left in FIG. 2 is the downstream sealing fin 110B in the relationship with the leftmost sealing fin 110, and is the upstream sealing fin 110A in the relationship with the third sealing fin 110 from the left.

In the description below, the sealing fin 110 formed on the abovementioned first sealing segment 101A may be referred to as a first segment 105 (see FIG. 3). Similarly, the sealing fin 110 formed on the abovementioned second sealing segment 101B may be referred to as a second segment 106.

Figure 4:
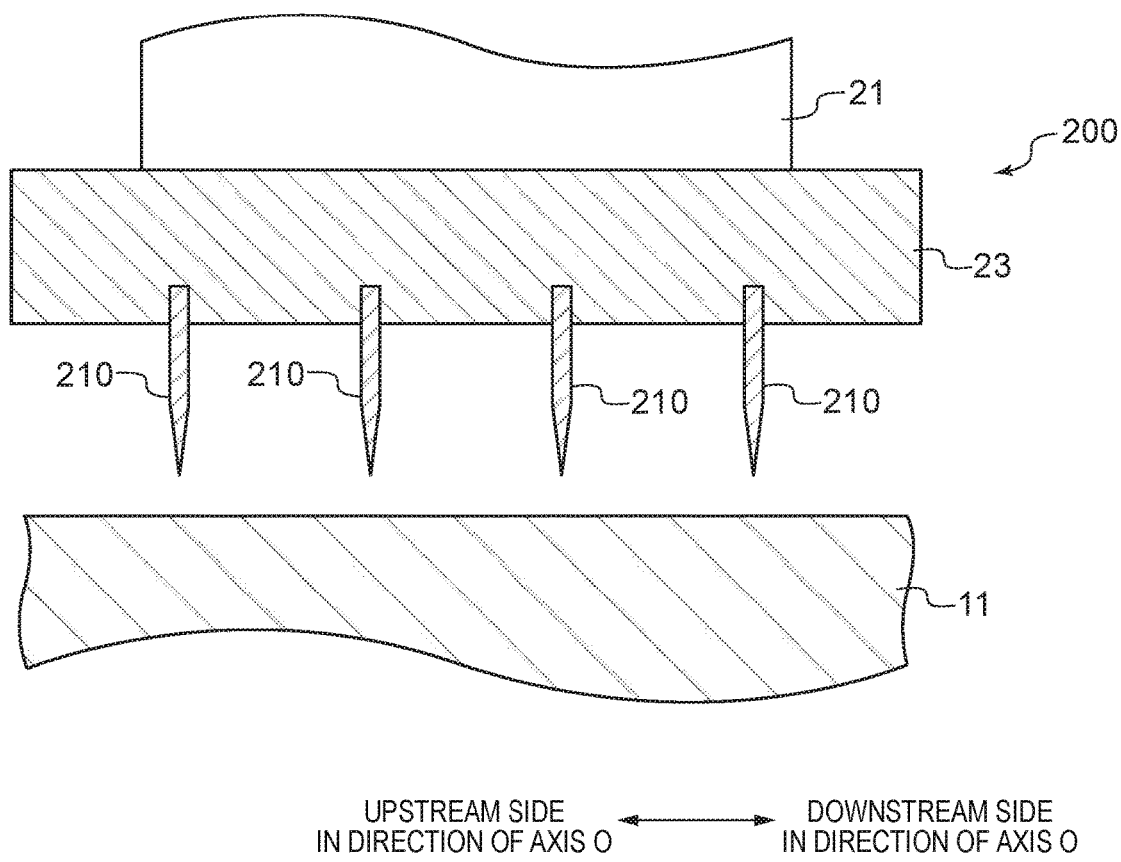
FIG. 4 is a view schematically illustrating a stationary-blade-side sealing apparatus according to several embodiments and is a cross-sectional view seen from the rotation direction of the rotor main body.

FIG. 4 is a view schematically illustrating a stationary-blade-side sealing apparatus 200 according to several embodiments, and is a cross-sectional view seen from the rotation direction of the rotor main body 11. The stationary-blade-side sealing apparatus 200 according to several embodiments is a sealing apparatus that seals the leakage of the steam S between the stationary blade rings 23 and the outer peripheral surface of the rotor main body 11, and includes sealing fins 210 protruding in the radial direction from the stationary blade ring 23 side toward the outer peripheral surface of the rotor main body 11 and extending in the circumferential direction of the rotor main body. In several embodiments, at least one or more sealing fins 210 are formed for the stationary blade ring 23. In the embodiment exemplified in FIG. 4, four sealing fins 210 are formed for the stationary blade ring 23 along the direction of the axis O so as to be separated from each other.

Self-Excited Vibration in Steam Turbine 1

As described above, in the axial-flow rotary machine as the steam turbine 1, the following feature is known. A swirling flow (so-called swirl flow) is generated in the circumferential direction of the rotor when the working fluid swerving from the main flow path flows into a sealing portion while the working fluid is still containing the swirling flow component applied to the working fluid when the working fluid passes through a nozzle. The sealing portion seals a place between the rotor or the rotor blades and the casing. By the swirl flow, a sinusoidal pressure distribution having a peak in a direction different from the eccentric direction of the rotor is generated in the circumferential direction of the rotor when eccentricity is generated in the rotor. This may cause self-excited vibration of the rotor when the swirl flow increases in accordance with high-power operation, for example. Therefore, various structures for suppressing the swirl flow in the sealing portion are devised.

However, in recent years, in axial-flow rotary machines such as steam turbines and gas turbines, there is a tendency to reduce the rotor diameter and increase stages of the blades in order to enhance the turbine efficiency. Therefore, the diameter of the rotor decreases and the axis of the rotor increases, and hence the self-excited vibration of the rotor tends to be generated more easily. Thus, measures for suppressing the self-excited vibration more effectively is required.

Thus, in several embodiments, the self-excited vibration of the rotor 3 is suppressed by suppressing the swirl flow as follows. Details are described below.

FIG. 5 to FIG. 15 are views schematically illustrating the shape of the sealing fin 110 of the rotor-blade-side sealing apparatus 100 according to several embodiments. FIG. 11 to FIG. 14 are also views illustrating the shapes of a first extending portion 115 and a second extending portion 117 described below.

The contents described below are also applicable to the sealing fin 210 of the stationary-blade-side sealing apparatus 200, and hence the sealing fin 110 of the rotor-blade-side sealing apparatus 100 is mainly described in the description below and the description of the sealing fin 210 of the stationary-blade-side sealing apparatus 200 is omitted, as appropriate.

In several embodiments illustrated in FIG. 5 to FIG. 15, the sealing fin 110 of the rotor-blade-side sealing apparatus 100 includes a first sealing-fin main body portion 111 and a second sealing-fin main body portion 112 separated from each other in the circumferential direction across the gap portion 113 that is a discontinuity along the circumferential direction.

The sealing fin 110 of the rotor-blade-side sealing apparatus 100 includes the first extending portion 115 extending from an end portion 111a of the first sealing-fin main body portion 111 toward the downstream side in the rotation direction R of the rotor main body 11. The first extending portion 115 extends so as to approach the upstream side in the direction of the axis O of the rotor main body 11 as the first extending portion 115 approaches the downstream side in the rotation direction R.

The gap portion 113 is a part in which the sealing fin 110 extending along the circumferential direction is disconnected in the circumferential direction. In other words, the gap portion 113 can be said to be a part in which an end portion of the sealing fin 110 extending toward the downstream side in the rotation direction R of the rotor main body 11 toward the gap portion 113 on the downstream side in the rotation direction R of the rotor main body 11 and an end portion of the sealing fin 110 extending toward the upstream side in the rotation direction R of the rotor main body 11 toward the gap portion 113 on the upstream side in the rotation direction R of the rotor main body 11 are not connected.

In the rotor-blade-side sealing apparatus 100 for suppressing the leakage flow of the steam S along the direction of the axis O of the rotor main body 11, the gap portion 113 may be a through hole that passes through the sealing fin 110 in the direction of the axis O of the rotor main body 11 or a cutout portion considering the function of the gap portion 113 that can actively cause the steam S to flow from the upstream side to the downstream side in the direction of the axis O of the rotor main body 11 via the gap portion 113 as described below.

In several embodiments illustrated in FIG. 5 to FIG. 15, the first extending portion 115 and the gap portion 113 at least partially overlap each other when seen from the direction of the axis O of the rotor main body 11.

For the purpose of illustration, the swirl flow flowing toward the downstream side in the rotation direction R of the rotor main body 11 along the sealing fin 110 between the rotor blade rings 34 and the inner circumferential surface 25 of the casing 2 on the upstream side of the sealing fin 110 in the direction of the axis O of the rotor main body 11 may be simply referred to as an upstream swirl flow. The swirl flow flowing toward the downstream side in the rotation direction R of the rotor main body 11 along the sealing fin 110 between the rotor blade rings 34 and the inner circumferential surface 25 of the casing 2 on the downstream side of the sealing fin 110 in the direction of the axis O of the rotor main body 11 may be simply referred to as a downstream swirl flow.

In the description below, the flow rate of the swirl flow flowing toward the downstream side in the rotation direction R of the rotor main body 11 may be referred to as a circumferential velocity of a swirl flow or simply as a circumferential velocity.

When the swirl flow is indicated by an arrow in each figure, the arrow may be denoted by a symbol SW and may be expressed as a swirl flow SW in the description below. Similarly, when the upstream swirl flow is indicated by an arrow in each figure, the arrow may be denoted by a symbol SWu, and may be expressed as an upstream swirl flow SWu in the description below. When the downstream swirl flow is indicated by an arrow in each figure, the arrow may be denoted by a symbol SWd and may be expressed as a downstream swirl flow SWd in the description below.

Figure 5:
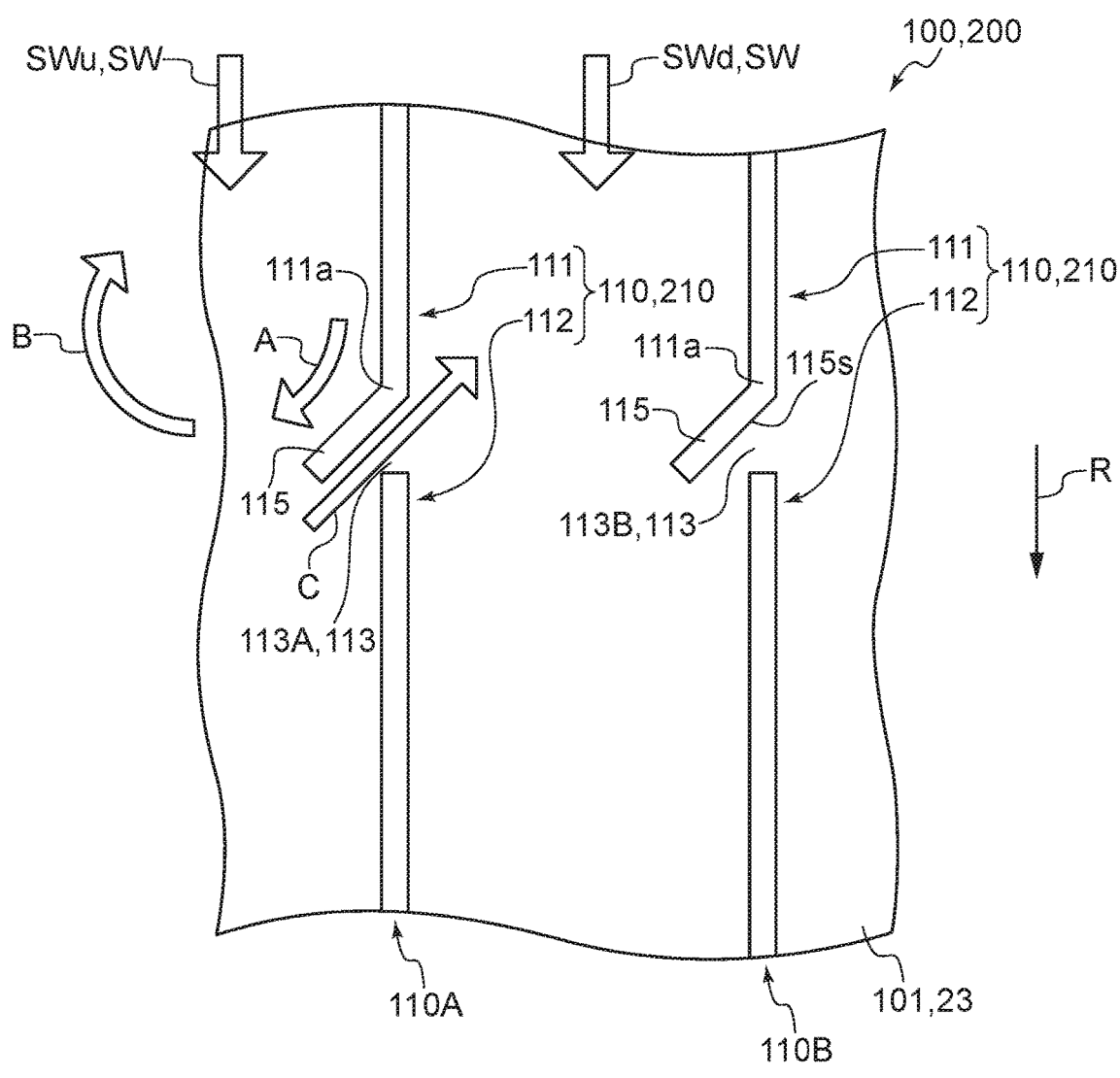
FIG. 5 is a view schematically illustrating the shape of a sealing fin of the rotor-blade-side sealing apparatus according to several embodiments.
Figure 6:
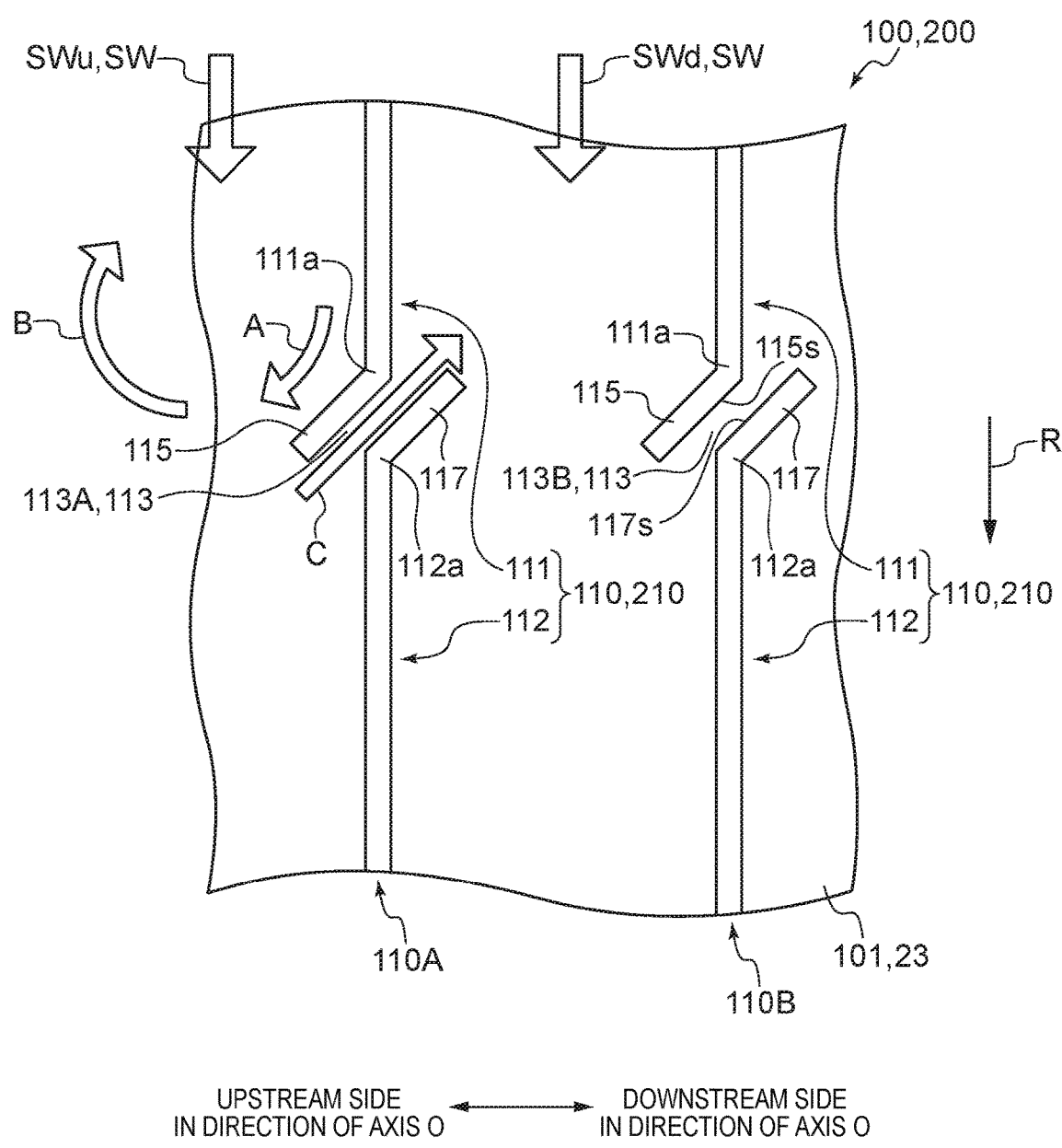
FIG. 6 is a view schematically illustrating the shape of the sealing fin of the rotor-blade-side sealing apparatus according to several embodiments.

In the rotor-blade-side sealing apparatus 100 according to several embodiments illustrated in FIG. 5 to FIG. 15, the first extending portion 115 extends so as to approach the upstream side in the direction of the axis O of the rotor main body 11 as the first extending portion 115 approaches the downstream side in the rotation direction R of the rotor main body 11. Therefore, as illustrated in FIG. 5 and FIG. 6, for example, a velocity component toward the upstream side in the axial direction of the rotor main body 11 is applied to the upstream swirl flow SWu by the first extending portion 115 as indicated by arrow A. Thus, as indicated by arrow B, a spiral flow can be generated in the upstream swirl flow SWu, and the circumferential velocity of the upstream swirl flow SWu can be suppressed.

In the rotor-blade-side sealing apparatus 100 according to several embodiments illustrated in FIG. 5 to FIG. 15, a part of the upstream swirl flow SWu flows into the downstream side of the sealing fin 110 in the direction of the axis O of the rotor main body 11 via the gap portion 113 as indicated by arrow C in FIG. 5 and FIG. 6, for example. Thus, as indicated by arrow C, the steam S flowing into the downstream side of the sealing fin 110 in the direction of the axis O of the rotor main body 11 via the gap portion 113 can affect the flow of the downstream swirl flow SWd, and the circumferential velocity of the downstream swirl flow SWd can be suppressed. As a result, in the steam turbine 1 using the rotor-blade-side sealing apparatus 100 according to several embodiments illustrated in FIG. 5 to FIG. 15, the generation of the self-excited vibration can be suppressed.

The steam turbine 1 according to several embodiments includes the casing 2, the rotor main body 11, the plurality of rotor blade main bodies 31, the rotor blade rings 34, and the rotor-blade-side sealing apparatus 100 according to several embodiments illustrated in FIG. 5 to FIG. 15.

The steam turbine 1 according to several embodiments includes the rotor-blade-side sealing apparatus 100 according to several embodiments illustrated in FIG. 5 to FIG. 15, and hence the generation of the self-excited vibration in the steam turbine 1 can be suppressed.

The description in FIG. 5 and FIG. 6 are omitted in order to prevent the drawings to be complicated, but the swirl flow SW expressed as the downstream swirl flow SWd in FIG. 5 and FIG. 6 is the downstream swirl flow SWd in the relationship with the sealing fin 110 upstream of the swirl flow SW in the direction of the axis O, and is the upstream swirl flow SWu in the relationship with the sealing fin 110 on the downstream side in the direction of the axis O. A velocity component toward the upstream side in the axial direction of the rotor main body 11 is applied to the swirl flow SW by the first extending portion 115 of the sealing fin 110. Thus, a spiral flow is also generated in the swirl flow SW, and the circumferential velocity of the swirl flow SW is suppressed.

In several embodiments illustrated in FIG. 5 to FIG. 15, the sealing fin 210 of the stationary-blade-side sealing apparatus 200 includes the first sealing-fin main body portion 111 and the second sealing-fin main body portion 112 separated from each other in the circumferential direction across the gap portion 113 that is a discontinuity along the circumferential direction. The sealing fin 210 of the stationary-blade-side sealing apparatus 200 includes the first extending portion 115 extending from the end portion 111a of the first sealing-fin main body portion 111 toward the downstream side in the rotation direction R of the rotor main body 11. The first extending portion 115 extends so as to approach the upstream side in the direction of the axis O of the rotor main body 11 as the first extending portion 115 approaches the downstream side in the rotation direction R.

In the stationary-blade-side sealing apparatus 200 according to several embodiments illustrated in FIG. 5 to FIG. 15, the first extending portion 115 extends so as to approach the upstream side in the direction of the axis O of the rotor main body 11 as the first extending portion 115 approaches the downstream side in the rotation direction R of the rotor main body 11. Therefore, a velocity component toward the upstream side in the direction of the axis O of the rotor main body 11 is applied to the swirl flow flowing toward the downstream side in the rotation direction R of the rotor main body 11 along the sealing fin 210 between the stationary blade rings 23 and the outer peripheral surface of the rotor main body 11 by the first extending portion 115. Thus, a spiral flow can be generated in the swirl flow, and the circumferential velocity of the swirl flow can be suppressed.

In the stationary-blade-side sealing apparatus 200 according to several embodiments illustrated in FIG. 5 to FIG. 15, a part of the swirl flow flowing toward the downstream side in the rotation direction R of the rotor main body 11 along the sealing fin 210 flows into the downstream side of the sealing fin 210 in the direction of the axis O of the rotor main body 11 via the gap portion 113. Thus, the steam S flowing into the downstream side of the sealing fin 210 in the direction of the axis O of the rotor main body 11 via the gap portion 113 can affect the flow of the swirl flow on the downstream side of the sealing fin 210 in the direction of the axis O of the rotor main body 11, and the circumferential velocity of the swirl flow can be suppressed. As a result, in the steam turbine 1 using the stationary-blade-side sealing apparatus 200 according to several embodiments illustrated in FIG. 5 to FIG. 15, the generation of the self-excited vibration can be suppressed.

In several embodiments illustrated in FIG. 6 to FIG. 15, the sealing fin 110 includes the second extending portion 117 extending from an end portion 112a of the second sealing-fin main body portion 112 toward the upstream side in the rotation direction R of the rotor main body 11. The second extending portion 117 extends so as to approach the downstream side in the direction of the axis O of the rotor main body 11 as the second extending portion 117 approaches the upstream side in the rotation direction R.

In several embodiments illustrated in FIG. 6 to FIG. 15, the sealing fin 110 includes the second extending portion 117 extending from the end portion 112a of the second sealing-fin main body portion 112, and hence the steam S flowing into the downstream side of the sealing fin 110 in the direction of the axis O of the rotor main body 11 via the gap portion 113 is guided by the second extending portion 117 as indicated by arrow C in FIG. 6. At that time, the second extending portion 117 extends so as to approach the downstream side in the direction of the axis O of the rotor main body 11 as the second extending portion 117 approaches the upstream side in the rotation direction R of the rotor main body 11, and hence a velocity component toward the upstream side in the rotation direction R of the rotor main body 11 is applied to the steam S guided by the second extending portion 117. Thus, the circumferential velocity of the downstream swirl flow SWd is suppressed by the steam S guided by the second extending portion 117. As a result, in the steam turbine 1 using the rotor-blade-side sealing apparatus 100 according to several embodiments illustrated in FIG. 6 to FIG. 15, the generation of the self-excited vibration can be effectively suppressed.

The length by which the first extending portion 115 and the second extending portion 117 extend in the direction of the axis O is equal to or less than ½, for example, of an arrangement pitch P between the sealing fins 110 adjacent to each other in the direction of the axis O of the rotor main body 11, that is, 0.5 P, for example.

Figure 7:
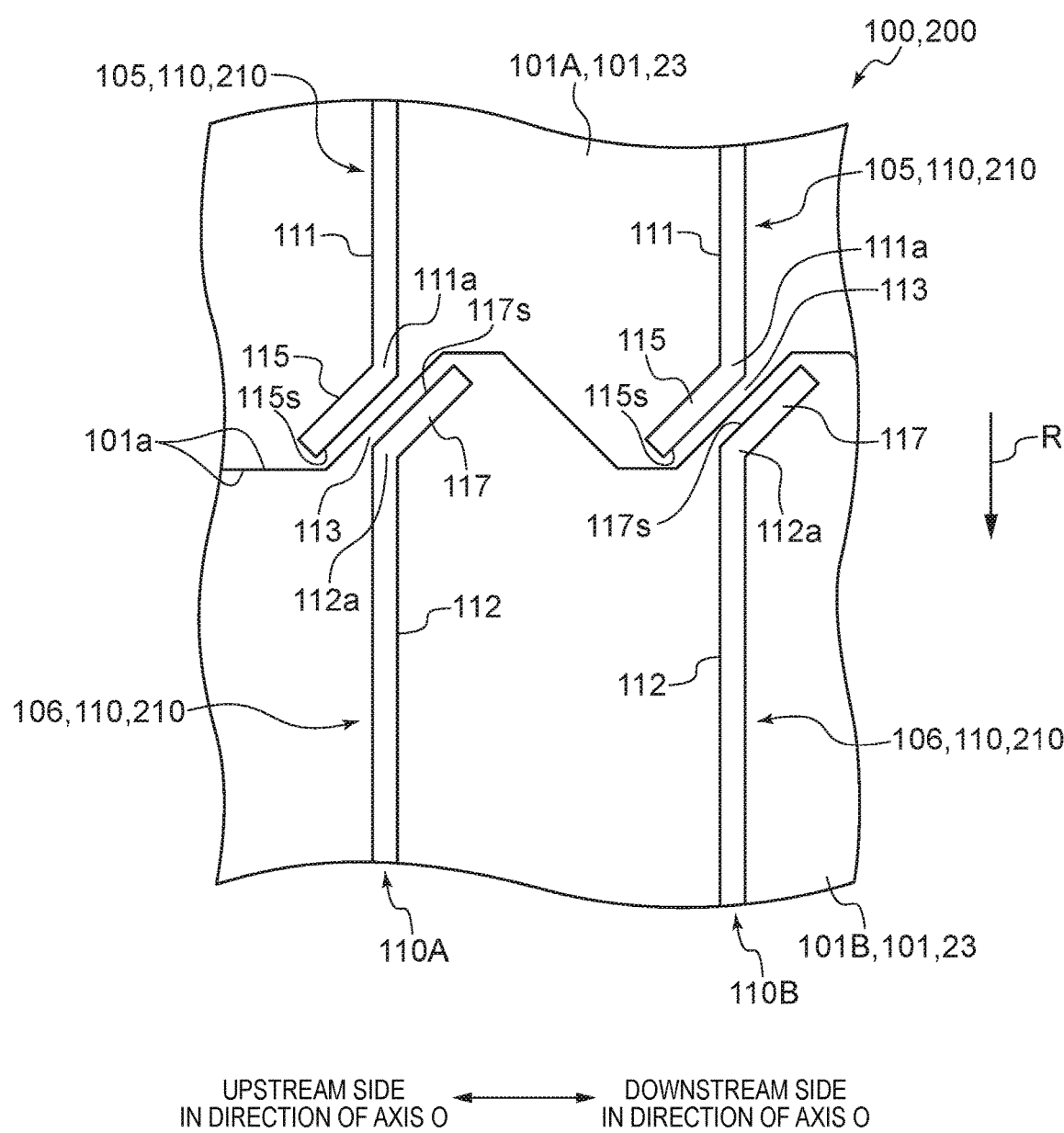
FIG. 7 is a view schematically illustrating the shape of the sealing fin of the rotor-blade-side sealing apparatus according to several embodiments.
Figure 8:
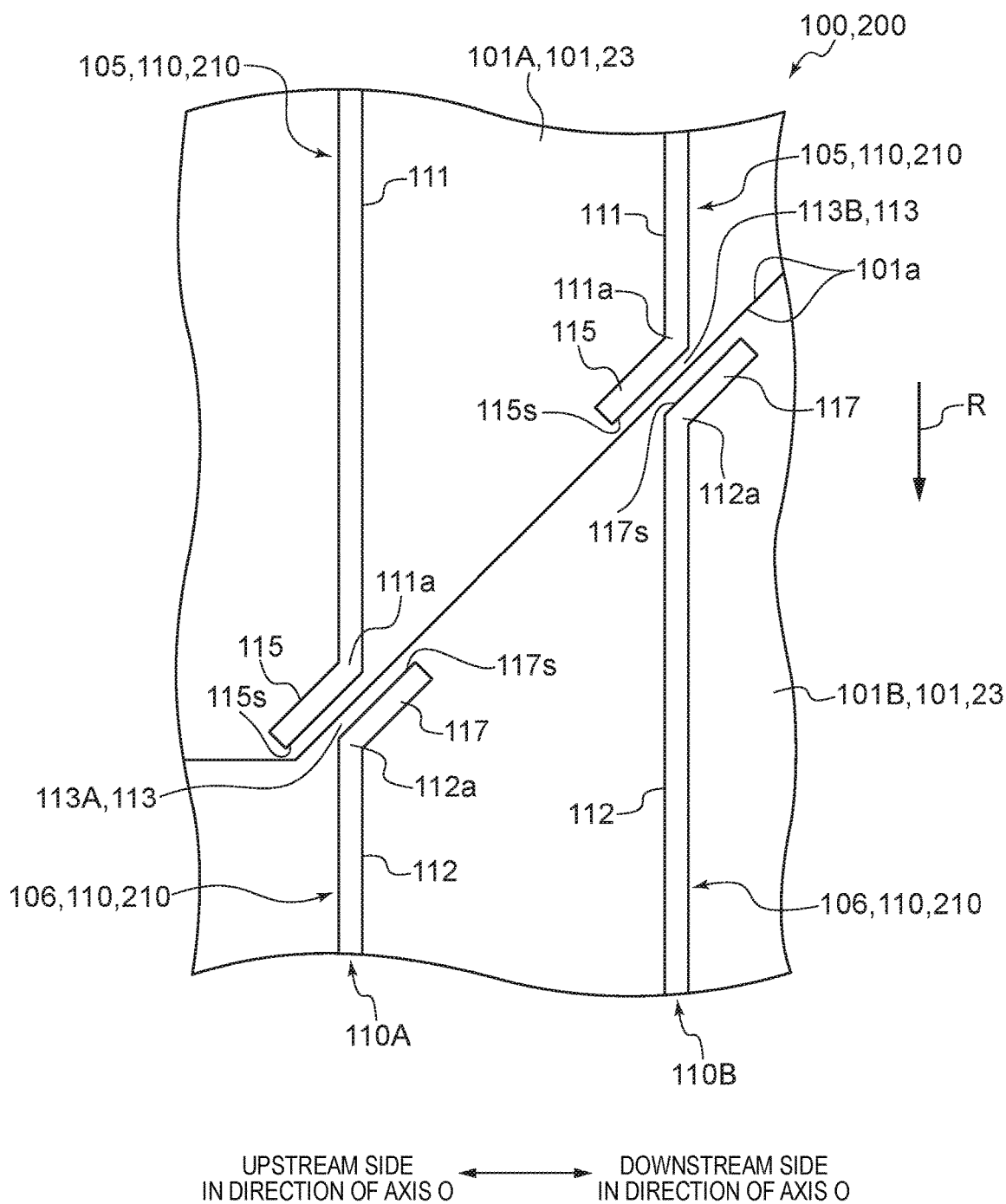
FIG. 8 is a view schematically illustrating the shape of the sealing fin of the rotor-blade-side sealing apparatus according to several embodiments.
Figure 9:
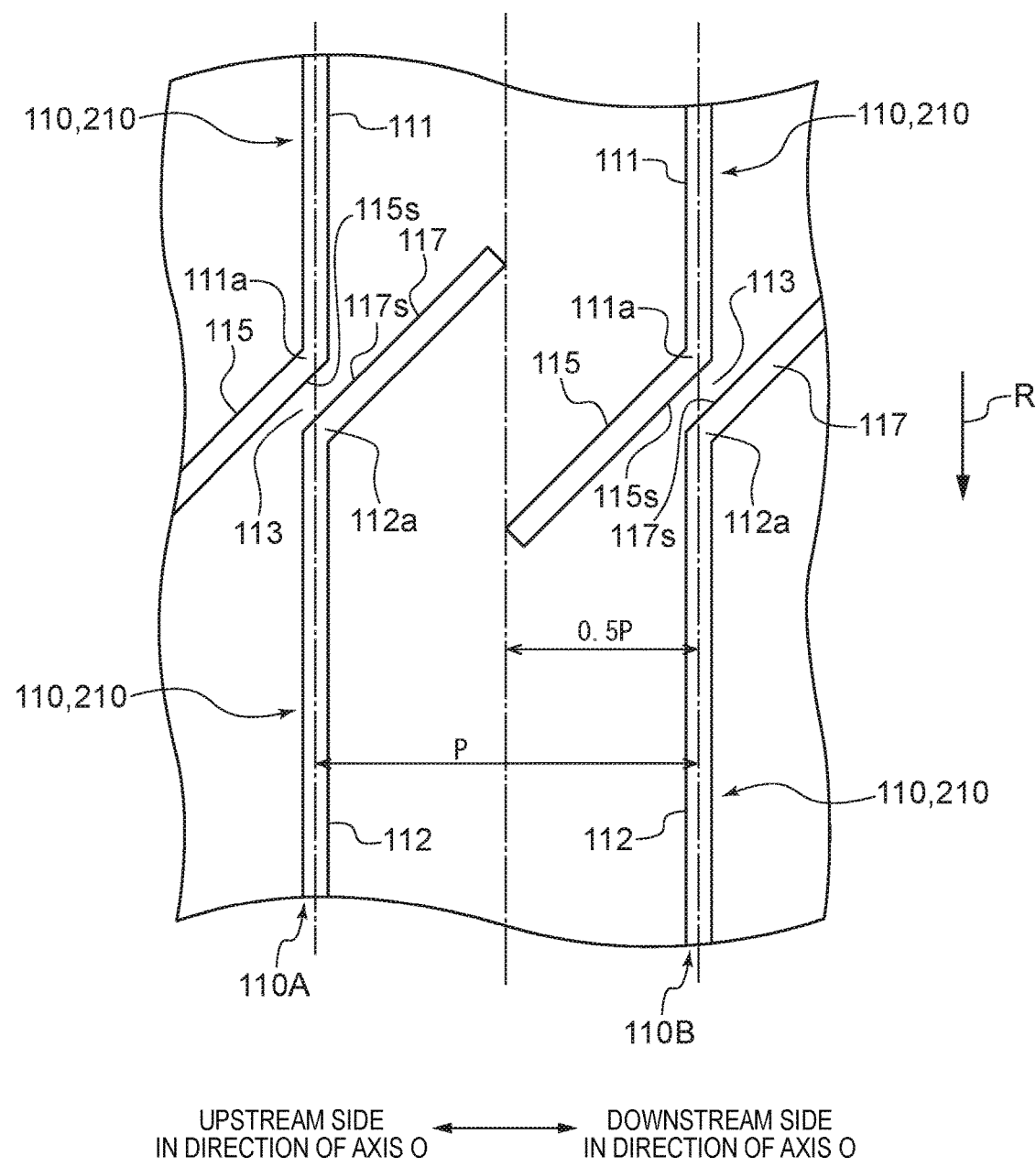
FIG. 9 is a view schematically illustrating the shape of the sealing fin of the rotor-blade-side sealing apparatus according to several embodiments.

The reason is as follows. As described below, the first extending portion 115 and the second extending portion 117 may be formed near the border between the adjacent sealing segments 101 as illustrated in FIG. 7 and FIG. 8. In this case, when the length by which the first extending portion 115 and the second extending portion 117 extend in the direction of the axis O exceeds 0.5 P, the region near the end surface 101a becomes difficult to mold as compared to when the length by which the first extending portion 115 and the second extending portion 117 extend in the direction of the axis O is set to be equal to or less than 0.5 P due to reasons relating to the manufacture of the sealing segments 101.

In several embodiments illustrated in FIG. 6 to FIG. 15, at least a part of the surface of the first extending portion 115 on the downstream side in the direction of the axis O of the rotor main body 11 and at least a part of the surface of the second extending portion 117 on the upstream side in the direction of the axis O of the rotor main body 11 are opposed to each other across the gap portion 113.

The state in which the first extending portion 115 and the second extending portion 117 are opposed to each other across the gap portion 113 means a state in which a normal line of a surface 115s of the first extending portion 115 on the downstream side in the direction of the axis O of the rotor main body 11 intersects with the second extending portion 117, or a state in which a normal line of a surface 117s of the second extending portion 117 on the upstream side in the direction of the axis O of the rotor main body 11 intersects with the first extending portion 115, for example. Alternatively, a state in which an intermediate surface corresponding to an intermediate position between the surface 115s and the surface 117s can be defined may be the opposed state.

In the description below, the part in which the first extending portion 115 and the second extending portion 117 are opposed to each other across the gap portion 113 is referred to as an opposed section Os. In the opposed section Os, the flow path of the steam S is formed by the first extending portion 115 and the second extending portion 117 opposed to each other across the gap portion 113. In several embodiments illustrated in FIG. 11 to FIG. 14, the opposed section Os is exemplified.

In several embodiments illustrated in FIG. 6 to FIG. 15, a velocity component toward the upstream side in the rotation direction R of the rotor main body 11 is applied to the steam S flowing into the downstream side of the sealing fin 110 in the direction of the axis O of the rotor main body 11 via the gap portion 113 as described above. In several embodiments illustrated in FIG. 6 to FIG. 15, the steam S flowing into the downstream side of the sealing fin 110 in the direction of the axis O of the rotor main body 11 via the gap portion 113 passes through a part in which at least a part of the surface 115s of the first extending portion 115 on the downstream side in the direction of the axis O of the rotor main body 11 and at least a part of the surface 117s of the second extending portion 117 on the upstream side in the direction of the axis O of the rotor main body 11 are opposed to each other across the gap portion 113, that is, the opposed section Os. Thus, the steam S is adjusted by passing through the opposed section Os, and the passing velocity of the steam S that has passed through the opposed section Os increases as compared to when there is no opposed section Os. That is, in several embodiments illustrated in FIG. 6 to FIG. 15, a larger velocity component toward the upstream side in the rotation direction R of the rotor main body 11 is applied to the steam S flowing into the downstream side of the sealing fin 110 in the direction of the axis O of the rotor main body 11 via the gap portion 113 when the steam S passes through the opposed section Os. As a result, in the steam turbine 1 using the rotor-blade-side sealing apparatus 100 according to several embodiments illustrated in FIG. 6 to FIG. 15, the generation of the self-excited vibration can be more effectively suppressed.

Figure 10:
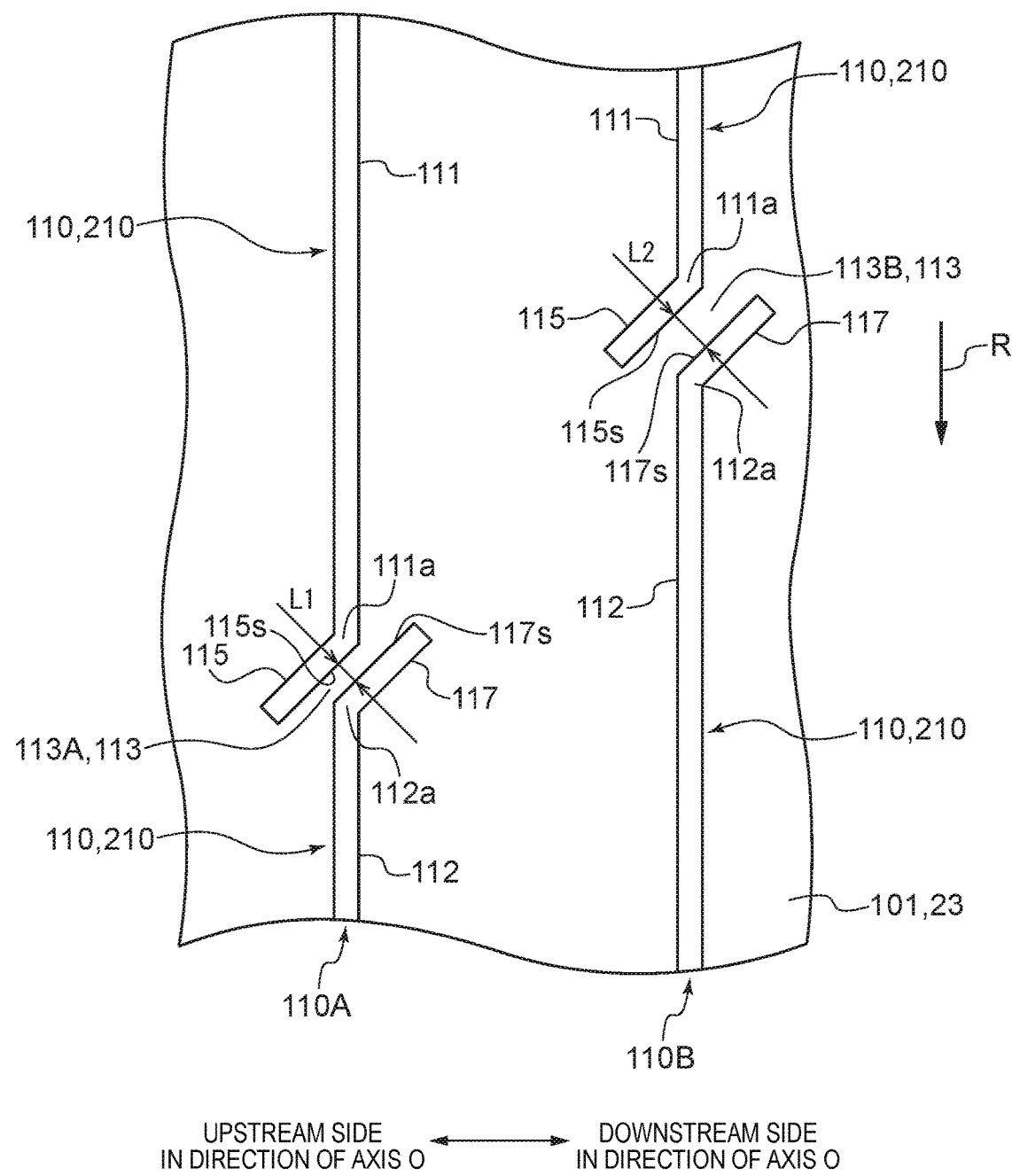
FIG. 10 is a view schematically illustrating the shape of the sealing fin of the rotor-blade-side sealing apparatus according to several embodiments.
Figure 11:
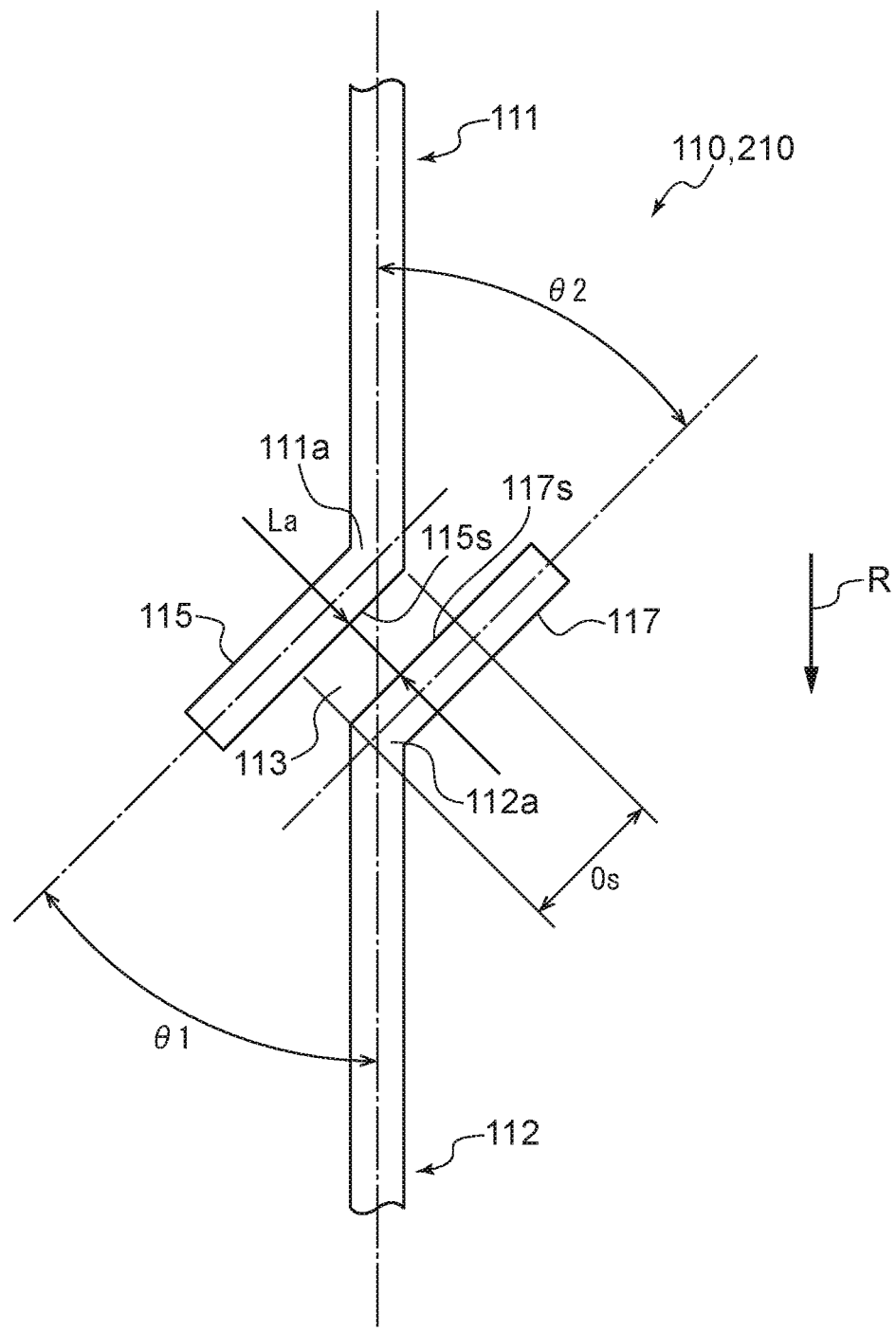
FIG. 11 is a view schematically illustrating the shape of the sealing fin of the rotor-blade-side sealing apparatus according to several embodiments.

In several embodiments illustrated in FIG. 6 to FIG. 11 and FIG. 15, for example, as clearly indicated in FIG. 11, at least a part of the surface 115s of the first extending portion 115 on the downstream side in the direction of the axis O of the rotor main body 11 and at least a part of the surface 117s of the second extending portion 117 on the upstream side in the direction of the axis O of the rotor main body 11 are opposed to each other across the gap portion 113 by a certain separated distance La.

Thus, when the flow of the steam S passing through the opposed section Os in which the first extending portion 115 and the second extending portion 117 are opposed to each other flows into the downstream side against the downstream swirl flow SWd, the flow passing through the opposed section Os and the downstream swirl flow SWd are mixed together while causing turbulence. As a result, the effect of suppressing the circumferential velocity of the downstream swirl flow SWd by the steam S passing through the opposed section Os and flowing into the downstream side of the sealing fin 110 in the direction of the axis O of the rotor main body 11 can be increased.

Figure 12:
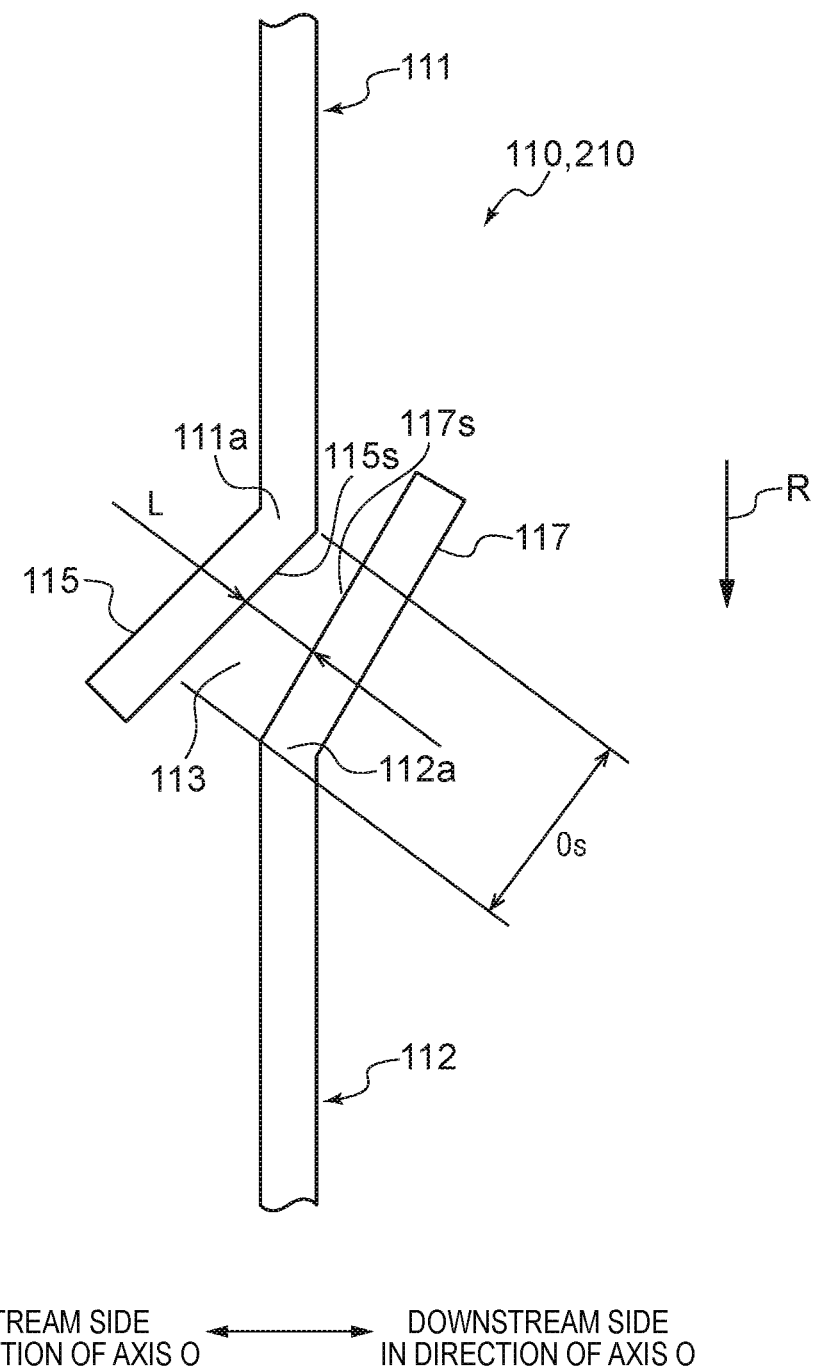
FIG. 12 is a view schematically illustrating the shape of the sealing fin of the rotor-blade-side sealing apparatus according to several embodiments.

In an embodiment illustrated in FIG. 12, at least a part of the surface 115s of the first extending portion 115 on the downstream side in the direction of the axis O of the rotor main body 11 and at least a part of the surface 117s of the second extending portion 117 on the upstream side in the direction of the axis O of the rotor main body 11 are opposed to each other across the gap portion 113, and a separated distance L decreases as approaching the downstream side in the direction of the axis O of the rotor main body 11.

In an embodiment illustrated in FIG. 12, the abovementioned separated distance L decreases as the abovementioned separated distance L approaches the downstream side in the direction of the axis O of the rotor main body 11, and hence the flow rate of the steam S increases in the opposed section Os in which the first extending portion 115 and the second extending portion 117 are opposed to each other as the opposed section Os approaches the downstream side in the direction of the axis O of the rotor main body 11. Therefore, the flow rate of the steam S flowing into the downstream side of the sealing fin 110 in the direction of the axis O of the rotor main body 11 can be increased. Thus, the velocity component toward the upstream side in the rotation direction R of the rotor main body 11 in the steam S flowing into the downstream side of the sealing fin 110 in the direction of the axis O of the rotor main body 11 can be increased. As a result, the effect of suppressing the circumferential velocity of the downstream swirl flow SWd by the steam S passing through the gap portion 113 and flowing into the downstream side of the sealing fin 110 in the direction of the axis O of the rotor main body 11 can be increased.

In several embodiments illustrated in FIG. 5 to FIG. 12 and FIG. 15, the first extending portion 115 linearly extends so as to approach the upstream side in the direction of the axis O of the rotor main body 11 as the first extending portion 115 approaches the downstream side in the rotation direction R of the rotor main body 11.

As a result, the shape of the first extending portion 115 becomes simple, and the first extending portion 115 is easily formed.

The same can be applied to the second extending portion 117. As in several embodiments illustrated in FIG. 6 to FIG. 12 and FIG. 15, when the second extending portion 117 is formed so that the second extending portion 117 linearly extends so as to approach the upstream side in the direction of the axis O of the rotor main body 11 as the second extending portion 117 approaches the downstream side in the rotation direction R of the rotor main body 11, the shape of the second extending portion 117 becomes simple, and the second extending portion 117 is easily formed.

In several embodiments illustrated in FIG. 5 to FIG. 12 and FIG. 15, the first extending portion 115 extends so as to approach the upstream side in the direction of the axis O of the rotor main body 11 at an inclination angle θ1 (see FIG. 11) of 30 degrees or more and 60 degrees or less with respect to the extending direction of the first sealing-fin main body portion 111 as the first extending portion 115 approaches the downstream side in the rotation direction R of the rotor main body 11.

The inclination angle θ1 of the first extending portion 115 with respect to the extending direction of the first sealing-fin main body portion 111, that is, the deviation angle between the extending direction of the first extending portion 115 and the extending direction of the first sealing-fin main body portion 111 is desired to be set within a predetermined range from the following viewpoints. In the description below, the inclination angle θ1 of the first extending portion 115 with respect to the extending direction of the first sealing-fin main body portion 111 is referred to as the inclination angle θ1 of the first extending portion 115 or simply as the inclination angle θ1.

That is, when the inclination angle θ1 of the first extending portion 115 is less than 30 degrees, the effect of applying the velocity component toward the upstream side in the direction of the axis O of the rotor main body 11 to the upstream swirl flow SWu (see FIG. 5 and FIG. 6) is small, and hence there is a fear that it becomes difficult to generate a spiral flow in the upstream swirl flow SWu. Thus, there is a fear that the effect of suppressing the circumferential velocity of the upstream swirl flow SWu becomes difficult to obtain. Therefore, the inclination angle θ1 of the first extending portion 115 is desired to be 30 degrees or more.

When the inclination angle θ1 of the first extending portion 115 is larger than 60 degrees, the velocity component toward the upstream side in the rotation direction R of the rotor main body 11 in the steam S flowing into the downstream side of the sealing fin 110 in the direction of the axis O of the rotor main body 11 via the gap portion 113 becomes small. Thus, the effect of suppressing the circumferential velocity of the downstream swirl flow SWd becomes small. Therefore, the inclination angle θ1 of the first extending portion 115 is desired to be 60 degrees or less.

In that respect, in several embodiments illustrated in FIG. 5 to FIG. 12 and FIG. 15, the inclination angle θ1 of the first extending portion 115 is set to 30 degrees or more and 60 degrees or less, and hence the circumferential velocity of the upstream swirl flow SWu and the downstream swirl flow SWd can be effectively suppressed.

An inclination angle θ2 of the second extending portion 117 with respect to the extending direction of the second sealing-fin main body portion 112, that is, the deviation angle between the extending direction of the second extending portion 117 and the extending direction of the second sealing-fin main body portion 112 is referred to as the inclination angle θ2 of the second extending portion 117 or simply as the inclination angle θ2. As described above, the second extending portion 117 can form the opposed section Os together with the first extending portion 115 and obtain the effect of suppressing the circumferential velocity of the downstream swirl flow SWd by the steam S passing through the opposed section Os. Thus, in several embodiments illustrated in FIG. 6 to FIG. 12 and FIG. 15, it is considered that the deviation between the extending direction of the second extending portion 117 and the extending direction of the first extending portion 115 is preferred to be small except for the case in which the passing velocity of the steam S blown out from the opposed section Os is caused to be high as in an embodiment illustrated in FIG. 12.

Thus, in several embodiments illustrated in FIG. 6 to FIG. 11 and FIG. 15, the inclination angle θ2 of the second extending portion 117 is desired to be 30 degrees or more and 60 degrees or less.

Figure 13:
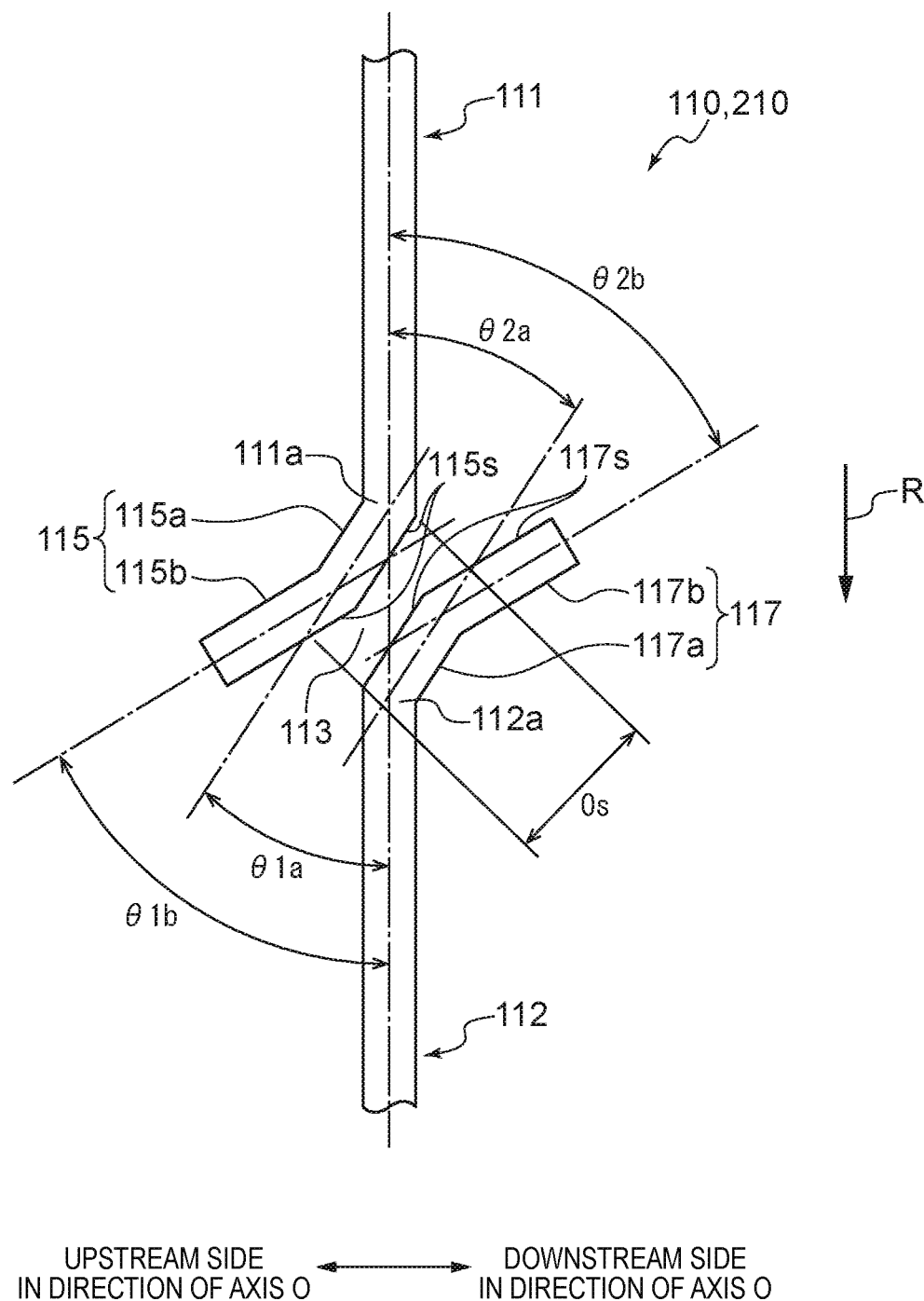
FIG. 13 is a view schematically illustrating the shape of the sealing fin of the rotor-blade-side sealing apparatus according to several embodiments.
Figure 14:
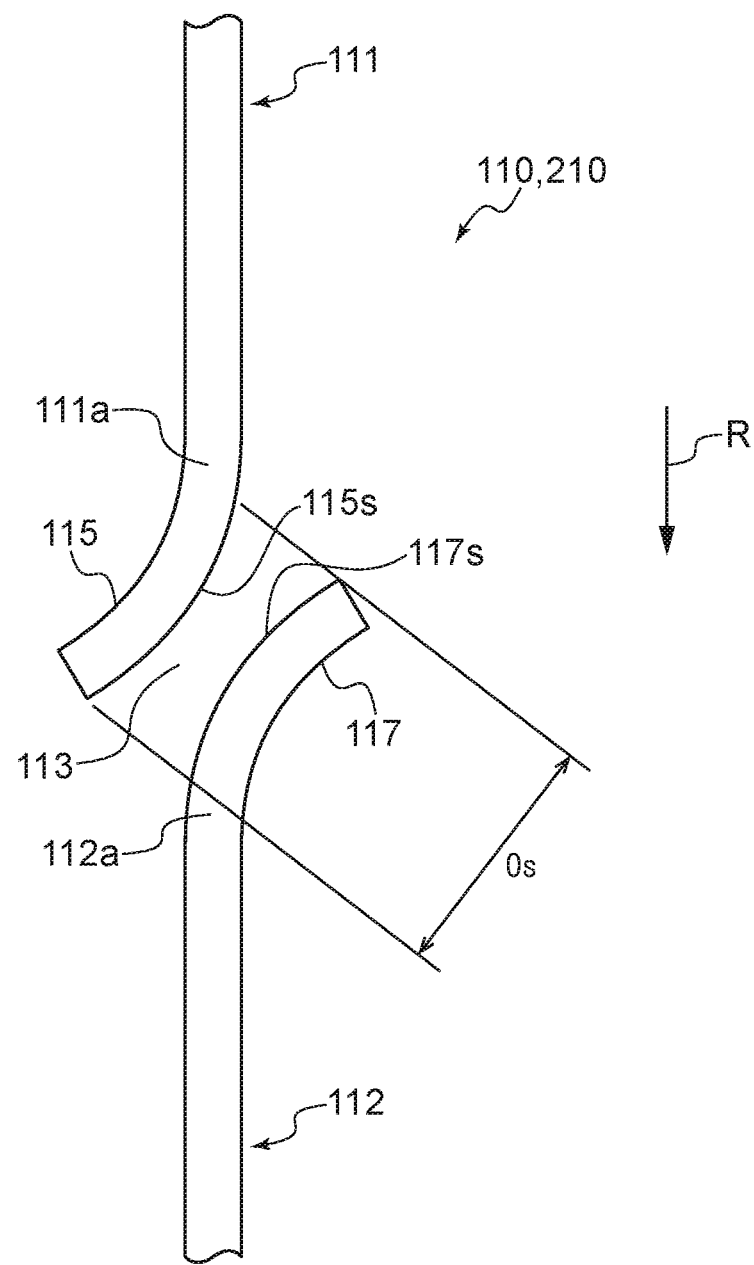
FIG. 14 is a view schematically illustrating the shape of the sealing fin of the rotor-blade-side sealing apparatus according to several embodiments.

In several embodiments illustrated in FIG. 13 and FIG. 14, the first extending portion 115 extends so as to form a convex toward the gap portion 113 such that the first extending portion 115 approaches the upstream side in the direction of the axis O of the rotor main body 11 as the first extending portion 115 approaches the downstream side in the rotation direction R of the rotor main body 11.

That is, for example, in an embodiment illustrated in FIG. 13, the first extending portion 115 includes a first base-end-side extending portion 115a extending from the end portion 111a of the first sealing-fin main body portion 111 toward the downstream side in the rotation direction R of the rotor main body 11, and a first distal-end-side extending portion 115b that further extends toward the downstream side in the rotation direction R from an end portion of the first base-end-side extending portion 115a on the downstream side in the rotation direction R.

In an embodiment illustrated in FIG. 13, an inclination angle θ1b of the first distal-end-side extending portion 115b with respect to the extending direction of the first sealing-fin main body portion 111 is larger than an inclination angle θ1a of the first base-end-side extending portion 115a with respect to the extending direction of the first sealing-fin main body portion 111. Thus, in an embodiment illustrated in FIG. 13, the first extending portion 115 extends so as to form a convex toward the gap portion 113 such that the first extending portion 115 approaches the upstream side in the direction of the axis O of the rotor main body 11 as the first extending portion 115 approaches the downstream side in the rotation direction R of the rotor main body 11.

For example, in an embodiment illustrated in FIG. 14, the first extending portion 115 is formed in an arc shape in which the center of the curvature exists upstream of the sealing fin 110 in the direction of the axis O of the rotor main body 11. Thus, in an embodiment illustrated in FIG. 14, the first extending portion 115 extends so as to form a convex toward the gap portion 113 such that the first extending portion 115 approaches the upstream side in the direction of the axis O of the rotor main body 11 as the first extending portion 115 approaches the downstream side in the rotation direction R of the rotor main body 11.

As described above, in several embodiments illustrated in FIG. 13 and FIG. 14, the first extending portion 115 extends so as to form a convex toward the gap portion 113, and hence the velocity component toward the upstream side in the direction of the axis O of the rotor main body 11 can be effectively applied to the upstream swirl flow SWu.

As in several embodiments illustrated in FIG. 13 and FIG. 14, the second extending portion 117 may extend so as to form a convex toward the gap portion 113 such that the second extending portion 117 approaches the downstream side in the direction of the axis O of the rotor main body 11 as the second extending portion 117 approaches the upstream side in the rotation direction R of the rotor main body 11.

For example, in an embodiment illustrated in FIG. 13, the second extending portion 117 includes a second base-end-side extending portion 117a extending toward the upstream side in the rotation direction R of the rotor main body 11 from the end portion 112a of the second sealing-fin main body portion 112, and a second distal-end-side extending portion 117b further extending toward the upstream side in the rotation direction R from the end portion of the second base-end-side extending portion 117a on the upstream side in the rotation direction R.

In an embodiment illustrated in FIG. 13, an inclination angle θ2b of the second distal-end-side extending portion 117b with respect to the extending direction of the second sealing-fin main body portion 112 is larger than an inclination angle θ2a of the second base-end-side extending portion 117a with respect to the extending direction of the second sealing-fin main body portion 112.

For example, in an embodiment illustrated in FIG. 14, the second extending portion 117 is formed in an arc shape in which the center of the curvature exists downstream of the sealing fin 110 in the direction of the axis O of the rotor main body 11.

In several embodiments illustrated in FIG. 5 to FIG. 14, the first sealing-fin main body portion 111 and the second sealing-fin main body portion 112 are formed in the same position in the direction of the axis O of the rotor main body 11.

As a result, the sealing fin 110 is formed easier as compared to when the first sealing-fin main body portion 111 and the second sealing-fin main body portion 112 are formed in different positions in the direction of the axis O of the rotor main body 11.

Figure 15:
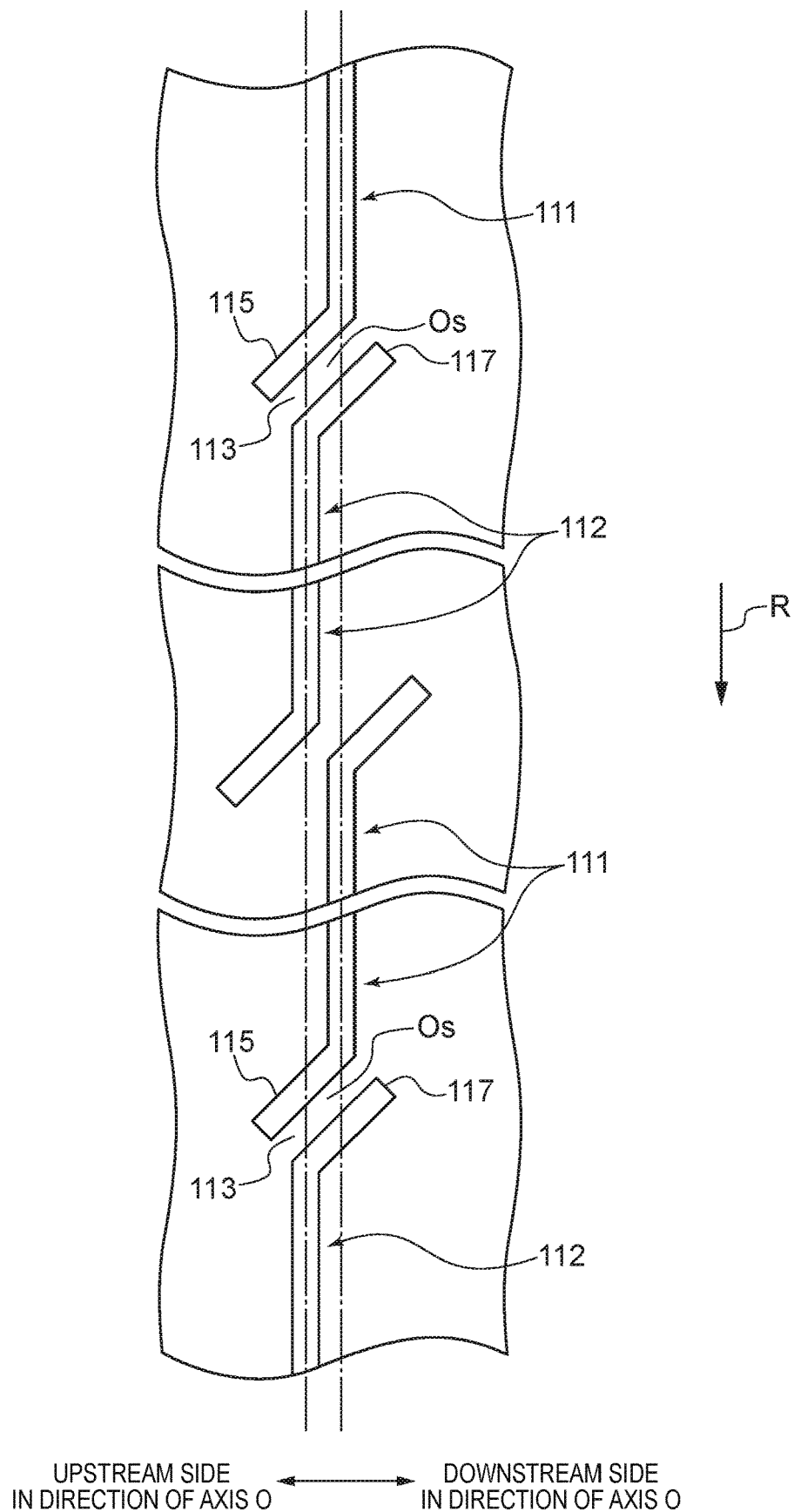
FIG. 15 is a view schematically illustrating the shape of the sealing fin of the rotor-blade-side sealing apparatus according to several embodiments.

In an embodiment illustrated in FIG. 15, the second sealing-fin main body portion 112 is formed upstream of the first sealing-fin main body portion 111 in the direction of the axis O of the rotor main body 11.

In an embodiment illustrated in FIG. 15, the sealing fins 110 adjacent to each other on the downstream side with respect to the second sealing-fin main body portion 112 in the rotation direction R of the rotor main body 11 are formed downstream of the second sealing-fin main body portion 112 in the direction of the axis O of the rotor main body 11. As described above, by forming the sealing fins 110 adjacent to each other on the downstream side with respect to the second sealing-fin main body portion 112 in the rotation direction R of the rotor main body 11 on the downstream side of the second sealing-fin main body portion 112 in the direction of the axis O of the rotor main body 11, the forming positions of the sealing fins 110 are prevented from being sequentially deviated to the upstream side in the direction of the axis O of the rotor main body 11 as the forming positions approach the downstream side in the rotation direction R of the rotor main body 11. That is, in an embodiment illustrated in FIG. 15, the first sealing-fin main body portions 111 and the second sealing-fin main body portions 112 are formed so that pairs each formed by the first sealing-fin main body portion 111 and the second sealing-fin main body portion 112 formed upstream of the first sealing-fin main body portion 111 in the direction of the axis O of the rotor main body 11 sequentially appear along the rotation direction R of the rotor main body 11.

In an embodiment illustrated in FIG. 15, the steam S flowing into the downstream side of the sealing fin 110 in the direction of the axis O of the rotor main body 11 via the gap portion 113 passes through the opposed section Os. In an embodiment illustrated in FIG. 15, the second sealing-fin main body portion 112 is formed upstream of the first sealing-fin main body portion 111 in the direction of the axis O of the rotor main body 11, and hence the length of the abovementioned opposed section Os can be increased as compared to when the second sealing-fin main body portion 112 is not formed upstream of the first sealing-fin main body portion 111 in the direction of the axis O of the rotor main body 11. Thus, the steam S flowing into the downstream side of the sealing fin 110 in the direction of the axis O of the rotor main body 11 via the gap portion 113 passes through a longer opposed section Os as compared to when the second sealing-fin main body portion 112 is not formed upstream of the first sealing-fin main body portion 111 in the direction of the axis O of the rotor main body 11, and hence a larger velocity component toward the upstream side in the rotation direction R of the rotor main body 11 is applied to the steam S. As a result, in the steam turbine 1 using the rotor-blade-side sealing apparatus 100 according to an embodiment illustrated in FIG. 15, the generation of the self-excited vibration can be more effectively suppressed.

In several embodiments according to FIG. 5 to FIG. 10, the sealing fin 110 includes the upstream sealing fin 110A formed on the upstream side in the direction of the axis O of the rotor main body 11, and the downstream sealing fin 110B formed downstream of the upstream sealing fin 110A in the direction of the axis O of the rotor main body 11. The upstream sealing fin 110A and the downstream sealing fin 110B each include the first sealing-fin main body portion 111, the second sealing-fin main body portion 112, and the first extending portion 115.

In several embodiments according to FIG. 5 to FIG. 10, for example, as clearly illustrated in FIG. 5 and FIG. 6, the first extending portion 115 of the upstream sealing fin 110A extends so as to approach the upstream side in the direction of the axis O of the rotor main body 11 as the first extending portion 115 approaches the downstream side in the rotation direction R of the rotor main body 11. Therefore, a velocity component toward the upstream side in the direction of the axis O of the rotor main body 11 is applied to the swirl flow SW flowing toward the downstream side in the rotation direction R of the rotor main body 11 along the first sealing-fin main body portion 111 of the upstream sealing fin 110A between the rotor blade rings 34 and the inner circumferential surface 25 of the casing 2, that is, the upstream swirl flow SWu according to the upstream sealing fin 110A by the first extending portion 115 of the upstream sealing fin 110A as indicated by arrow A. Thus, a spiral flow can be generated in the swirl flow SWu as indicated by arrow b, and the circumferential velocity of the swirl flow SWu can be suppressed.

In several embodiments according to FIG. 5 to FIG. 10, for example, as clearly indicated in FIG. 5 and FIG. 6, a part of the upstream swirl flow SWu according to the upstream sealing fin 110A flows into a place between the upstream sealing fin 110A and the downstream sealing fin 110B via the gap portion 113 of the upstream sealing fin 110A as indicated by arrow C. Thus, the steam S flowing into a place between the upstream sealing fin 110A and the downstream sealing fin 110B via the gap portion 113 of the upstream sealing fin 110A can affect the swirl flow SW flowing through a place between the upstream sealing fin 110A and the downstream sealing fin 110B, that is, the flow of the downstream swirl flow SWd according to the upstream sealing fin 110A, and the circumferential velocity of the swirl flow SWd can be suppressed.

The swirl flow SW flowing through a place between the upstream sealing fin 110A and the downstream sealing fin 110B is the downstream swirl flow SWd according to the upstream sealing fin 110A with respect to the upstream sealing fin 110A, but is the upstream swirl flow SWu according to the downstream sealing fin 110B with respect to the downstream sealing fin 110B.

In several embodiments according to FIG. 5 to FIG. 10, for example, as clearly indicated in FIG. 5 and FIG. 6, the first extending portion 115 of the downstream sealing fin 110B extends so as to approach the upstream side in the direction of the axis O of the rotor main body 11 as the first extending portion 115 approaches the downstream side in the rotation direction R of the rotor main body 11. Therefore, a velocity component toward the upstream side in the direction of the axis O of the rotor main body 11 is applied to the swirl flow SW flowing through a place between the upstream sealing fin 110A and the downstream sealing fin 110B, that is, the upstream swirl flow according to the downstream sealing fin 110B by the first extending portion 115 of the downstream sealing fin 110B. Thus, a spiral flow can be generated in the swirl flow SW, and the circumferential velocity of the swirl flow SW can be suppressed.

In several embodiments according to FIG. 5 to FIG. 10, for example, as clearly indicated in FIG. 5 and FIG. 6, a part of the upstream swirl flow according to the downstream sealing fin 110B flows into the downstream side of the downstream sealing fin 110B in the direction of the axis O of the rotor main body 11 via the gap portion 113 of the downstream sealing fin 110B. Thus, the steam S flowing into the downstream side of the downstream sealing fin 110B in the direction of the axis O of the rotor main body 11 via the gap portion 113 of the downstream sealing fin 110B can affect the flow of the swirl flow SW on the downstream side of the downstream sealing fin 110B in the direction of the axis O of the rotor main body 11, that is, the downstream swirl flow according to the downstream sealing fin 110B, and the circumferential velocity of the swirl flow SW can be suppressed.

As a result, in the steam turbine 1 using the rotor-blade-side sealing apparatus 100 according to several embodiments illustrated in FIG. 5 to FIG. 10, the generation of the self-excited vibration can be effectively suppressed.

In several embodiments illustrated in FIG. 8 and FIG. 10, a downstream gap portion 113B that is the gap portion 113 for the downstream sealing fin 110B and is a discontinuity in the downstream sealing fin 110B along the circumferential direction is provided upstream of an upstream gap portion 113A in the rotation direction R of the rotor main body 11. The upstream gap portion 113A is the gap portion 113 for the upstream sealing fin 110A and is a discontinuity in the upstream sealing fin 110A along the circumferential direction.

As a result, as described below, the circumferential velocity of the swirl flow SW flowing through a place between the upstream sealing fin 110A and the downstream sealing fin 110B can be effectively suppressed as compared to when the downstream gap portion 113B is not provided upstream of the upstream gap portion 113A in the rotation direction R of the rotor main body 11.

That is, in several embodiments illustrated in FIG. 8 and FIG. 10, it becomes easier for the steam S that has passed through the upstream gap portion 113A to further flow into the downstream side of the downstream sealing fin 110B in the direction of the axis O of the rotor main body 11 from the downstream gap portion 113B after flowing into a place between the upstream sealing fin 110A and the downstream sealing fin 110B as compared to when the downstream gap portion 113B is not provided upstream of the upstream gap portion 113A in the rotation direction R of the rotor main body 11. Therefore, in several embodiments illustrated in FIG. 8 and FIG. 10, the passing velocity of the steam S that has passed through the upstream gap portion 113A can be increased as compared to when the downstream gap portion 113B is not provided upstream of the upstream gap portion 113A in the rotation direction R of the rotor main body 11.

As described above, a velocity component toward the upstream side in the rotation direction R of the rotor main body 11 is applied to the steam S passing through the upstream gap portion 113A and flowing into a place between the upstream sealing fin 110A and the downstream sealing fin 110B when the steam S passes through the upstream gap portion 113A. Therefore, when the passing velocity of the steam S passing through the upstream gap portion 113A increases, the velocity component toward the upstream side in the rotation direction R of the rotor main body 11 in the steam S also increases. As a result, the effect of suppressing the circumferential velocity of the swirl flow SW flowing through a place between the upstream sealing fin 110A and the downstream sealing fin 110B by the steam S can be increased.

As in an embodiment illustrated in FIG. 10, when the downstream gap portion 113B is provided upstream of the upstream gap portion 113A in the rotation direction R of the rotor main body 11, a separated interval L1 in the upstream gap portion 113A can be smaller than a separated interval L2 in the downstream gap portion 113B.

When the inlet swirl velocity is high as in a rotor blade tip seal, the upstream swirl flow SWu on the upstream side of the sealing fin 110 in the direction of the axis O of the rotor main body 11 has a higher circumferential velocity than the downstream swirl flow SWd on the downstream side of the sealing fin 110 in the direction of the axis O of the rotor main body 11. Thus, the flow rate of the steam S flowing into the downstream side of the sealing fin 110 via the upstream gap portion 113A is desired to be higher than the flow rate of the steam S flowing into the downstream side of the sealing fin 110 via the downstream gap portion 113B.

In that respect, as in an embodiment illustrated in FIG. 10, the flow rate of the steam S flowing into the downstream side of the sealing fin 110 via the upstream gap portion 113A can be higher than the flow rate of the steam S flowing into the downstream side of the sealing fin 110 via the downstream gap portion 113B by setting the separated interval L1 in the upstream gap portion 113A to be smaller than the separated interval L2 in the downstream gap portion 113B.

In several embodiments illustrated in FIG. 7 and FIG. 8, the sealing fin 110 at least includes the first segment 105 and the second segment 106 obtained by dividing the sealing fin 110 in the circumferential direction of the rotor main body 11. The first sealing-fin main body portion 111 and the first extending portion 115 are provided in the first segment 105. The second sealing-fin main body portion 112 and the second extending portion 117 are provided in the second segment 106.

That is, in several embodiments illustrated in FIG. 7 and FIG. 8, the first sealing-fin main body portion 111 and the first extending portion 115, and the second sealing-fin main body portion 112 and the second extending portion 117 that are provided so as to sandwich the gap portion 113 are arranged in different sealing segments 101. As described above, in several embodiments illustrated in FIG. 7 and FIG. 8, the first extending portion 115 and the second extending portion 117 are formed near the border between the adjacent sealing segments 101.

When focused on one sealing segment 101, in the sealing fin 110 of the sealing segment 101, the second extending portion 117 is provided on the upstream side in the rotation direction R of the rotor main body 11 and the first extending portion 115 is provided on the downstream side in the rotation direction R of the rotor main body 11.

In several embodiments illustrated in FIG. 7 and FIG. 8, the first sealing-fin main body portion 111 and the first extending portion 115 are provided in the first segment 105 and the second sealing-fin main body portion 112 and the second extending portion 117 are provided in the second segment 106, and hence the first extending portion 115 and the second extending portion 117 are formed near the end portions of the sealing segments 101 in the circumferential direction. Therefore, the first extending portion 115 and the second extending portion 117 are formed easier as compared to when the first extending portion 115 and the second extending portion 117 are formed in positions separated from the end portions of the sealing segment 101 in the circumferential direction.

The first extending portion 115 and the second extending portion 117 may be formed in the same sealing segment 101 across the gap portion 113.

The present invention is not limited to the abovementioned embodiments, and also includes forms obtained by the modifying abovementioned embodiments or forms obtained by combining those forms as appropriate.

For example, in several embodiments illustrated in FIG. 6 to FIG. 15, the first extending portion 115 and the second extending portion 117 may be formed so as to be symmetrical across the gap portion 113, or may be caused to be asymmetrical by changing the length, the extending angle, and the like of one of the first extending portion 115 or the second extending portion 117, for example.

In several embodiments illustrated in FIG. 6 to FIG. 15, the shape of the first extending portion 115 and the shape of the second extending portion 117 are approximately similar, but any of the first extending portions 115 illustrated in FIG. 11 to FIG. 14 and any of the second extending portions 117 illustrated in FIG. 11 to FIG. 14 may be combined, as appropriate, for example.

The invention claimed is:

1. A rotor-blade-side sealing apparatus configured to seal leakage of working fluid between rotor blade rings connected to distal end portions of a plurality of rotor blade main bodies attached so as to extend in a radial direction from a rotor main body configured to rotate about an axis in a casing, and an inner circumferential surface of the casing, the rotor-blade-side sealing apparatus comprising:
   a sealing fin protruding in the radial direction from a side of the inner circumferential surface of the casing toward one of the rotor blade rings and extending in a circumferential direction,
   wherein the sealing fin includes:
   a first sealing-fin main body portion and a second sealing-fin main body portion separated from each other in the circumferential direction across a gap portion that is a discontinuity along the circumferential direction;
   a first extending portion extending toward an upstream side in an axial direction of the rotor main body as the first extending portion approaches from an end portion of the first sealing-fin main body portion to a downstream side in a rotation direction of the rotor main body; and
   a second extending portion extending toward a downstream side in the axial direction of the rotor main body as the second extending portion approaches from an end portion of the second sealing-fin main body portion to an upstream side in the rotation direction of the rotor main body,
   wherein:
   at least a part of a surface of the first extending portion on the downstream side in the axial direction of the rotor main body and at least a part of a surface of the second extending portion on the upstream side in the axial direction of the rotor main body are opposed to each other across the gap portion; and
   the second sealing-fin main body portion is upstream of the first sealing-fin main body portion in the axial direction of the rotor main body.

2. The rotor-blade-side sealing apparatus according to claim 1, wherein:
   the sealing fin includes at least a first segment and a second segment obtained by dividing the sealing fin in the circumferential direction;
   the first sealing-fin main body portion and the first extending portion are in the first segment; and
   the second sealing-fin main body portion and the second extending portion are in the second segment.

3. A rotary machine, comprising:
   the rotor-blade-side sealing apparatus according to claim 1;
   the casing;
   the rotor main body;
   the plurality of rotor blade main bodies; and
   the rotor blade rings.

4. A rotor-blade-side sealing apparatus configured to seal leakage of working fluid between rotor blade rings connected to distal end portions of a plurality of rotor blade main bodies attached so as to extend in a radial direction from a rotor main body configured to rotate about an axis in a casing, and an inner circumferential surface of the casing, the rotor-blade-side sealing apparatus comprising:
   an upstream sealing fin which is on an upstream side in an axial direction of the rotor main body, the upstream sealing fin protruding in the radial direction from a side of the inner circumferential surface of the casing toward one of the rotor blade rings and extending in a circumferential direction; and
   a downstream sealing fin which is downstream of the upstream sealing fin in the axial direction of the rotor main body, the downstream sealing fin protruding in the radial direction from the side of the inner circumferential surface of the casing toward the one of the rotor blade rings and extending in the circumferential direction,
   wherein each of the upstream sealing fin and the downstream sealing fin includes:
   a first sealing-fin main body portion and a second sealing-fin main body portion separated from each other in the circumferential direction across a gap portion that is a discontinuity along the circumferential direction; and
   an extending portion extending toward the upstream side in the axial direction of the rotor main body as the extending portion approaches from an end portion of the first sealing-fin main body portion to a downstream side in a rotation direction of the rotor main body.

5. The rotor-blade-side sealing apparatus according to claim 4, wherein the gap portion of the downstream sealing fin is provided upstream, in the rotation direction of the rotor main body, of the gap portion of the upstream sealing fin.

6. A stationary-blade-side sealing apparatus configured to seal leakage of working fluid between stationary blade rings connected to distal end portions of a plurality of stationary blade main bodies attached so as to extend inward in a radial direction toward a rotor main body configured to rotate about an axis in a casing, and an outer peripheral surface of the rotor main body, the stationary-blade-side sealing apparatus comprising:
   a sealing fin protruding in the radial direction from a side of one of the stationary blade rings toward the outer peripheral surface of the rotor main body and extending in a circumferential direction,
   wherein the sealing fin includes:
   a first sealing-fin main body portion and a second sealing-fin main body portion separated from each other in the circumferential direction across a gap portion that is a discontinuity along the circumferential direction;
   a first extending portion extending from an end portion of the first sealing-fin main body portion toward a downstream side in a rotation direction of the rotor main body and extending so as to approach an upstream side in an axial direction of the rotor main body as the first extending portion approaches the downstream side in the rotation direction of the rotor main body; and
   a second extending portion extending toward a downstream side in the axial direction of the rotor main body as the second extending portion approaches from an end portion of the second sealing-fin main body portion to an upstream side in the rotation direction of the rotor main body,
   wherein:
   at least a part of a surface of the first extending portion on the downstream side in the axial direction of the rotor main body and at least a part of a surface of the second extending portion on the upstream side in the axial direction of the rotor main body are opposed to each other across the gap portion; and the second sealing-fin main body portion is upstream of the first sealing-fin main body portion in the axial direction of the rotor main body.

7. A stationary-blade-side sealing apparatus configured to seal leakage of working fluid between stationary blade rings connected to distal end portions of a plurality of stationary blade main bodies attached so as to extend inward in a radial direction toward a rotor main body configured to rotate about an axis in a casing, and an outer peripheral surface of the rotor main body, the stationary-blade-side sealing apparatus comprising:

an upstream sealing fin which is on an upstream side in an axial direction of the rotor main body, the upstream sealing fin protruding in the radial direction from a side of one of the stationary blade rings toward the outer peripheral surface of the rotor main body and extending in a circumferential direction; and a downstream sealing fin which is downstream of the upstream sealing fin in the axial direction of the rotor main body, the downstream sealing fin protruding in the radial direction from the side of the one of the stationary blade rings toward the outer peripheral surface of the rotor main body and extending in the circumferential direction, wherein each of the upstream sealing fin and the downstream sealing fin includes:

a first sealing-fin main body portion and a second sealing-fin main body portion separated from each other in the circumferential direction across a gap portion that is a discontinuity along the circumferential direction; and an extending portion extending from an end portion of the first sealing-fin main body portion toward a downstream side in a rotation direction of the rotor main body and extending so as to approach the upstream side in the axial direction of the rotor main body as the extending portion approaches the downstream side in the rotation direction of the rotor main body.

* * * * *